US012765459B2

(12) United States Patent
Singh et al.

(10) Patent No.: US 12,765,459 B2
(45) Date of Patent: Oct. 20, 2026

(54) HARVESTING LOGISTICS SYSTEM USING HARVEST ZONES BASED ON UNLOADING ZONES

(71) Applicant: Deere & Company, Moline, IL (US)

(72) Inventors: Rana Shakti Singh, Ramgarh (IN); Stephen R. Corban, Geneseo, IL (US); Nathan R. Vandike, Geneseo, IL (US); Federico Pardina-Malbran, Fort Collins, CO (US); Corey A. Akers, Highlands Ranch, CO (US); Ryan C. Russell, Orion, IL (US)

(73) Assignee: Deere & Company, Moline, IL (US)

( * ) Notice: Subject to any disclaimer, the term of this patent is extended or adjusted under 35 U.S.C. 154(b) by 66 days.

(21) Appl. No.: 18/620,524

(22) Filed: Mar. 28, 2024

(65) Prior Publication Data

US 2025/0301955 A1 Oct. 2, 2025

(51) Int. Cl.

| | |
|---|---|
| ***A01D 90/10*** | (2006.01) |
| ***A01D 41/127*** | (2006.01) |
| ***G05D 1/648*** | (2024.01) |
| ***G06Q 50/02*** | (2012.01) |
| *G05D 105/15* | (2024.01) |
| *G05D 107/20* | (2024.01) |

(52) U.S. Cl.

CPC ......... *A01D 41/1275* (2013.01); *A01D 90/10* (2013.01); *G05D 1/6482* (2024.01); *G06Q 50/02* (2013.01); *G05D 2105/15* (2024.01); *G05D 2107/21* (2024.01)

(58) Field of Classification Search

CPC ............... A01D 41/1275; A01D 90/10; G05D 2105/15; G05D 1/6482; G05D 2107/21; G06Q 50/02

See application file for complete search history.

(56) References Cited

U.S. PATENT DOCUMENTS

| | | | |
|---|---|---|---|
| 6,943,824 | B2 | 9/2005 | Alexia et al. |
| 7,167,797 | B2 | 1/2007 | Faivre et al. |

(Continued)

OTHER PUBLICATIONS

Khan A.U., et al., "Overview of Emerging Technologies for Improving the Performance of Heavy-Duty Construction Machines," IEEE Access, 2022, vol. 10, pp. 1-22.

(Continued)

*Primary Examiner* — Calvin Cheung

(74) *Attorney, Agent, or Firm* — Christopher J. Volkmann; KELLY, HOLT & CHRISTENSON PLLC

(57) ABSTRACT

An agricultural harvesting system includes one or more processors and memory storing instructions, executable by the one or more processors, that, when executed by the one or more processors, cause the one or more processors to perform steps comprising: obtaining harvesting logistics data; identifying, based, at least, on the harvesting logistics data, one or more unloading zones, each unloading zone indicative of a respective area at the worksite at which a material receiving machine is to be positioned to receive harvested material; selecting, based, at least, on the one or more unloading zones, one or more harvest zones, each harvest zone indicative of a respective area of a worksite to be harvested; and generating a control signal based, at least, on the one or more harvest zones.

15 Claims, 13 Drawing Sheets

(56) References Cited

U.S. PATENT DOCUMENTS

| | | | | |
|---|---|---|---|---|
| 7,725,233 | B2 | 5/2010 | Hendrickson et al. | |
| 8,060,283 | B2 | 11/2011 | Mott et al. | |
| 8,195,342 | B2 | 6/2012 | Anderson | |
| 8,195,358 | B2 | 6/2012 | Anderson | |
| 8,224,500 | B2 | 7/2012 | Anderson | |
| 8,229,618 | B2 | 7/2012 | Tolstedt et al. | |
| 8,392,065 | B2 | 3/2013 | Tolstedt et al. | |
| 8,437,901 | B2 | 5/2013 | Anderson | |
| 8,478,493 | B2 | 7/2013 | Anderson | |
| 8,639,408 | B2 | 1/2014 | Anderson | |
| 8,738,238 | B2 | 5/2014 | Rekow | |
| 8,818,567 | B2 | 8/2014 | Anderson | |
| 8,989,972 | B2 | 3/2015 | Anderson | |
| 9,188,980 | B2 | 11/2015 | Anderson | |
| 9,232,687 | B2 | 1/2016 | Bassett | |
| 9,235,214 | B2 | 1/2016 | Anderson | |
| 10,231,376 | B1 | 3/2019 | Stanhope et al. | |
| 10,597,235 | B2 | 3/2020 | Clucas et al. | |
| 10,813,265 | B2 | 10/2020 | Stanhope | |
| 11,069,005 | B2 | 7/2021 | Ethington et al. | |
| 11,080,798 | B2 | 8/2021 | Ethington et al. | |
| 11,178,818 | B2 | 11/2021 | Brammeier et al. | |
| 11,240,961 | B2 | 2/2022 | Anderson et al. | |
| 11,240,962 | B2 | 2/2022 | Kriebel et al. | |
| 11,406,071 | B2 | 8/2022 | Rowan et al. | |
| 11,499,295 | B2 | 11/2022 | Anderson | |
| 11,602,093 | B2 | 3/2023 | Stanhope | |
| 11,624,829 | B2 | 4/2023 | Dasika et al. | |
| 11,674,288 | B2 | 6/2023 | Anderson et al. | |
| 11,941,554 | B2 | 3/2024 | Tatge et al. | |
| 12,069,978 | B2 | 8/2024 | Vandike et al. | |
| 12,239,052 | B2 * | 3/2025 | Ritter | A01D 41/127 |
| 12,310,285 | B2 | 5/2025 | Meyers et al. | |
| 2009/0234695 | A1 | 9/2009 | Kapadi et al. | |
| 2013/0173321 | A1 | 7/2013 | Johnson | |
| 2013/0211658 | A1 | 8/2013 | Bonefas | |
| 2020/0090094 | A1 * | 3/2020 | Blank | G06Q 50/02 |
| 2020/0128738 | A1 | 4/2020 | Suleman et al. | |
| 2022/0122197 | A1 * | 4/2022 | Hanrieder | G05D 1/0044 |
| 2023/0320274 | A1 | 10/2023 | Vandike et al. | |
| 2024/0049633 | A1 | 2/2024 | Vandike et al. | |
| 2024/0049634 | A1 | 2/2024 | Vandike et al. | |
| 2024/0049635 | A1 | 2/2024 | Vandike et al. | |
| 2024/0049636 | A1 | 2/2024 | Vandike et al. | |
| 2024/0094724 | A1 * | 3/2024 | Peters | G05D 1/0016 |
| 2024/0244996 | A1 | 7/2024 | Vandike | |
| 2024/0311734 | A1 | 9/2024 | Meier | |
| 2025/0013953 | A1 | 1/2025 | Dettenbach et al. | |
| 2025/0048964 | A1 | 2/2025 | Farley et al. | |

OTHER PUBLICATIONS

Lamrhari S., et al., "A Profile-based Big Data Architecture for Agricultural Context," International Conference on Electrical and Information Technologies, 2016, pp. 1-6.

Misra N.N., et al., "IoT, Big Data, and Artificial Intelligence in Agriculture and Food Industry," IEEE Internet of Things Journal, May 2022, vol. 9(9), pp. 6305-6324.

Sigrimis N., et al., "Advances in Control of Agriculture and the Environment," IEEE Control Systems Magazine, Nov. 2001, vol. 21(5), pp. 8-12.

Atik A., et al., "Location and Allocation of Incident Respondents Under Severity Levels and Capacity Constraints: Formulation, Methodology, and Application," 2021 IEEE International Intelligent Transportation Systems Conference, Sep. 2021, pp. 2181-2186.

Mbiydzenyuy G., et al., "Road Travel Time Prediction—A Micro-level Sampling Approach," 16th International IEEE Conference on Intelligent Transportation Systems, Oct. 2013, pp. 1613-1618.

Wang W., et al., "Joint Planning and Optimal Operation of AC / DC Hybrid Distribution Network Considering Distributed Generation and EV Charging Station," 2022 Annual Meeting of CSEE Study Committee of HVDC and Power Electronics, 2022, pp. 1-8.

Yang D., et al., "Integrated Optimization on Layout Planning of Substation and Energy Storage Station in Photovoltaic Self-generating Grid," 2019 IEEE 2nd International Conference on Electronics Technology, 2019, pp. 457-463.

* cited by examiner

HARVESTING LOGISTICS SYSTEM USING HARVEST ZONES BASED ON UNLOADING ZONES

FIELD OF THE DESCRIPTION

The present description relates to agricultural worksite operations. More specifically, the present description relates to controlling agricultural worksite operations, such as agricultural harvesting operation.

BACKGROUND

There are a wide variety of different types of agricultural worksite operations. One type of agricultural worksite operation is an agricultural harvesting operation. During an agricultural harvesting operation, a plurality of agricultural work machines operate to harvest and carry away harvested material (e.g., grain). One type of agricultural work machine is an agricultural harvester. During a harvesting operation one or more harvesters operate at the worksite (which can include one or more fields) to harvest crop. Another type of agricultural work machine is a material receiving machine (e.g., mobile grain cart, mobile grain trailer, etc.). During a harvesting operation, one or more material receiving machines, such as mobile grain carts, mobile grain wagons, and mobile grain trailers, operate at the worksite to support the one or more harvesters and coordinate to receive and transport harvested material (e.g., grain) harvested by the one or more harvesters to other locations, including other locations away from the worksite. The plurality of mobile agricultural work machines can be controlled to coordinate the performance of the harvesting operation in an effort to distribute and route the mobile agricultural work machines to complete the agricultural harvesting operation efficiently.

The discussion above is merely provided for general background information and is not intended to be used as an aid in determining the scope of the claimed subject matter.

SUMMARY

An agricultural harvesting system includes one or more processors and memory storing instructions, executable by the one or more processors, that, when executed by the one or more processors, cause the one or more processors to perform steps comprising: obtaining harvesting logistics data; identifying, based, at least, on the harvesting logistics data, one or more unloading zones, each unloading zone indicative of a respective area at the worksite at which a material receiving machine is to be positioned to receive harvested material; selecting, based, at least, on the one or more unloading zones, one or more harvest zones, each harvest zone indicative of a respective area of a worksite to be harvested; and generating a control signal based, at least, on the one or more harvest zones.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
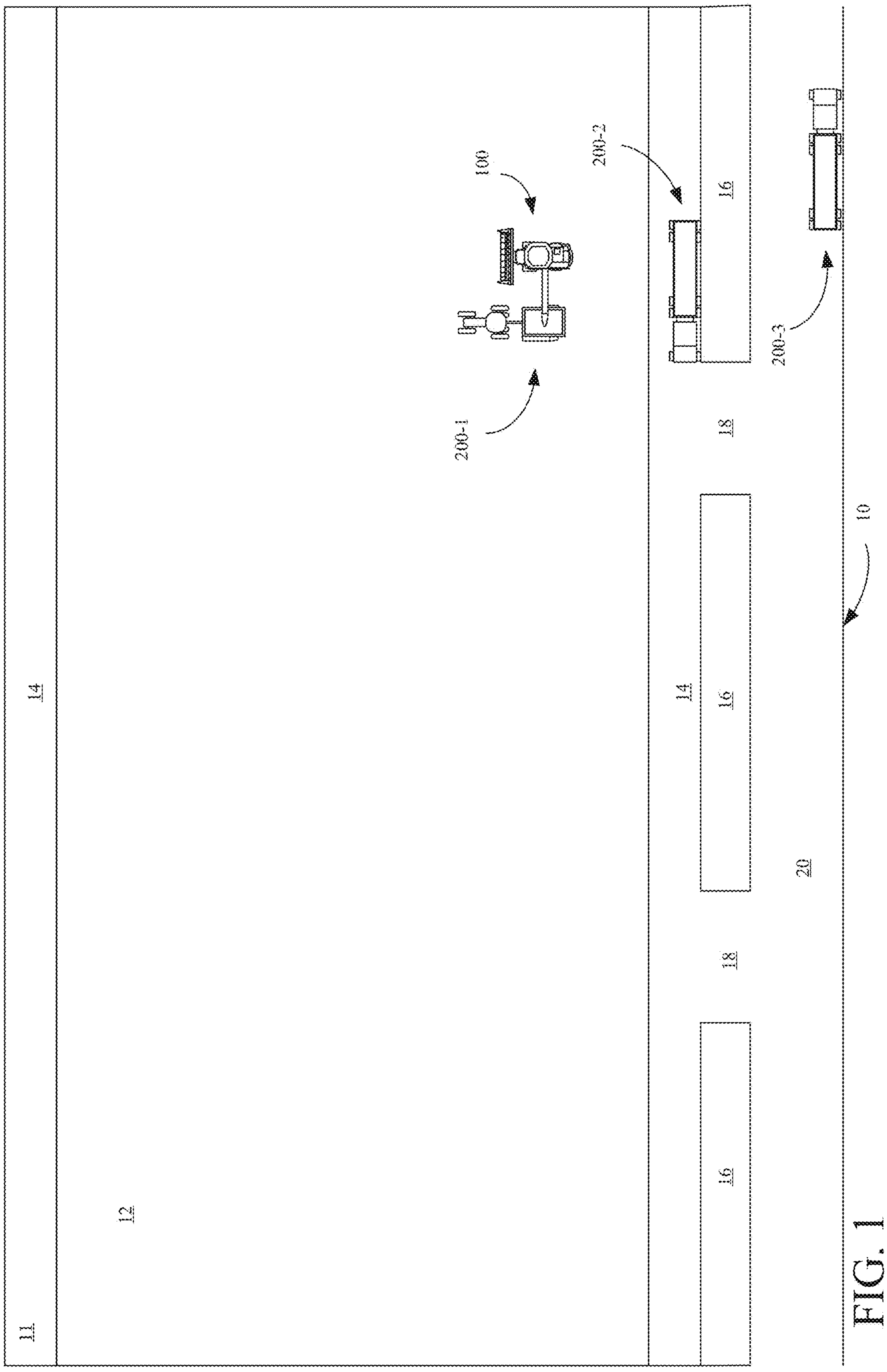
FIG. 1 is a pictorial illustration showing an example agricultural harvesting operation at an example agricultural worksite.

For the purpose of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example can be combined with the features, components, and/or steps described with respect to other examples of the present disclosure.

As discussed above, during a harvesting operation, one or more harvesters harvest crop at one or more fields. One or more mobile material receiving machines, such as mobile grain carts (e.g., towed grain carts) and mobile grain trailers (e.g., towed grain trailers), coordinate to receive harvested material from the mobile agricultural harvesting machines and to transport the harvested material from the one or more fields to a delivery location (e.g., dryer, storage location, purchasing facility, such as a grain mill, etc.).

One example agricultural harvesting operation includes, as a harvester, a combine harvester. As the combine harvester harvests crop at a field, clean grain is loaded into a grain tank on-board the combine harvester. A material receiving machine, such as a mobile grain cart, is controlled to rendezvous with the combine harvester such that the harvested material can be transferred from the grain tank on-board the combine harvester to the material receptacle of the mobile grain cart. Ideally, the transferring begins when the on-board grain tank is (or is nearly) full (at least to a threshold level) and takes place while the combine harvester continues to travel and harvest crop. Transferring while on the move is sometimes referred to as an in-tandem material transfer operation. Once the agricultural harvester has been emptied or has otherwise transferred a desired amount of material, or otherwise needs to end material transfer (e.g., prior to an upcoming turn), the mobile grain cart will travel to another location, such as to another mobile material receiving machine (e.g., a mobile grain trailer) or to another location, to transfer the grain from the material receptacle of the mobile grain cart to another location (e.g., material receptacle of the mobile grain trailer, or another location). In some examples, the mobile grain cart may first travel to another harvester to receive additional harvested material and then travel to another mobile material receiving machine or to another location, to transfer the grain from the material receptacle of the mobile grain cart to another location (e.g., material receptacle of the mobile grain trailer, or another location). The mobile grain cart, once emptied, will then be available to again rendezvous with the combine harvester (or to rendezvous with another harvester) to receive more harvested material. Generally, the mobile grain trailer remains parked at one location (e.g., an unloading zone) on the field during the operation (except for when moving to get into position or moving to leave the field). In some examples, the mobile grain trailer may move within the unloading zone, such as to adjust a landing point of material in the material receptacle. Ideally, the unloading location (or unloading zone) at which the mobile grain trailer is positioned to receive harvested material is close to an entrance/exit of the field and accommodates the size and turn radius of the towed grain trailer and minimizes potential damage (e.g., compaction, etc.) to the field. Eventually, the mobile grain trailer will become full (at least to a desired level) and will leave the field to deliver material to another location and is either replaced by another towed grain trailer or returns to the field after delivering material, or both. This logistical scheme continues until the harvesting operation at the field is complete.

Ideally, the agricultural harvesting operation is performed without any downtime for the agricultural harvesters. However, it can be difficult to efficiently schedule and control the material receiving machines to rendezvous with the agricultural harvesters at the ideal times (such that material transfer can begin before the harvesters become overfull). When an agricultural harvester becomes full without a material receiving machine available for material transfer, the agricultural harvester will stop harvesting and wait for a material receiving machine to become available. This downtime increases the cost of the operation and can lead to other deleterious effects. In some examples the agricultural harvester does not stop and, as a result, grain can spill out onto the ground.

There can be short windows of time during which ideal harvesting (e.g., harvesting crop when the crop is at desired moisture levels) can be completed. Downtime for the agricultural harvesters reduces the amount of crop that can be harvested during the short windows of time and can lead to more crop being harvested at less-than-ideal times (e.g., when the crop is not at desired moisture levels). A seller (e.g., grower, etc.) can be docked (i.e., paid less money) by a purchasing facility for harvested crop that is outside a desired moisture range. Thus, the seller will either make less money at the purchasing facility or will be required to run the crop through a dryer to bring the crop within the desired moisture range. Running the dryer increases costs. Crop that is too dry (i.e., is below the desired moisture range), will result in less pay from the purchasing facility. The purchasing facility pays for crop by weight. Crop that is less moist will weigh less than the same crop that is moister. As the purchasing facility is willing to pay full price for any crop within a given moisture range, it is best to have the crop at the top end of that given moisture range (for purposes of weight) or at least within the range so as not to be docked or to have less payable weight for the same crop. This is merely one example of a deleterious effect that can result from downtime during a harvesting operation.

In other examples, instead of harvesting crop at less-than-ideal times, harvesting can be delayed, increasing the operation window by hours, days, or weeks, which can increase costs, increase machine wear, and can, ultimately, result in poor crop in any case (e.g., if weather does not cooperate and another ideal window does not become available).

The location of the mobile grain trailers can impact the efficiency of the harvesting operation. Ideally, mobile grain trailers are positioned at unloading zones that are efficient for both the mobile grain trailers and efficient for the mobile grain carts hauling material to the mobile grain trailers. For example, if the mobile grain trailers are positioned further away from the field entrance/exit (e.g., in an effort to be closer to the harvesting location (harvesting zone)) it can take longer for the mobile grain trailers to leave and return to the field. Additionally, these closer unloading zones can be more likely to cause damage (e.g., compaction to the field) or result in the mobile grain trailers getting stuck (thus increasing downtime). In another example, if the mobile grain trailers are positioned closer to the field entrance/exit it can take longer for the mobile grain carts to reach the mobile grain trailers, unload, and travel back to a harvester to receive more material which can lead to increased downtime of a harvester.

It can be difficult for operation managers (e.g., grower, owner, operators, etc.) to plan and execute agricultural harvesting operation. The present discussion proceeds with example systems and methods that can generate logistics outputs that provide one or more of harvest zones (sub-areas of the field to be harvested, which can include an indication of order), material transfer locations (sub-areas of the field, generally in the harvest zones, at which a material receiving machine, such as a mobile grain cart, will receive harvested material from a harvester, which can include an indication of order), material flow (rate at which material will be available for delivery to deliver to a material receiving machine, such as mobile grain trailer, at an unloading zone) unloading zones, timing indicators (describing the time(s) at which a machine is to be at a given location), machine routes, presentations of the logistics output (e.g., maps, etc.), as well as other items. The logistics output can be used in the control of various items of an agricultural harvesting system architecture, including in the control of one or more agricultural work machines.

It will be understood that while various examples detailed herein proceed in the context of agricultural harvesting operation utilizing combine harvesters, it will be understood that the systems and methods described herein are applicable to and can be used in various other agricultural harvesting operations that utilize other types of harvesters. For example, cotton harvesting operations that utilize cotton harvesters, mobile basket machines (or mobile boll buggies) that receive cotton from the cotton harvesters and carry and deliver the cotton to another receiving machine, such as a module builder. Thus, it will be understood that, in some examples, material receiving machines can include mobile basket machines (or mobile boll buggies) and module builders, the module builders separate from the cotton harvesters.

FIG. 1 is a pictorial illustration showing an example agricultural harvesting operation at an example agricultural worksite. FIG. 1 illustrates an example harvesting operation in which a plurality mobile agricultural work machines carry out a harvesting operation at an example worksite 10. Worksite 10 includes a field 11, having a primary crop area 12 and headlands (or turnrows) 14. Worksite 10 also includes a road 20, field entrances/exits 18 and ditches 16. Field entrance/exit 18 useable by the mobile agricultural work machines to enter and exit field 10. The mobile agricultural work machines shown in FIG. 1 include an agricultural harvester 100 (illustratively a combine harvester) and a plurality of material receiving machines 200 (illustratively mobile grain cart 200-1 and mobile grain trailers 200-2 and 200-3).

As can be seen in FIG. 1, harvester 100 travels the field 11 and harvests crop. A mobile grain cart 200-1 is shown traveling in-tandem with harvester 100 and receiving harvested material from the harvester 100. A mobile grain trailer 200-2 is shown positioned at an unloading zone in the headlands 14. Additionally, as shown in FIG. 1, a mobile grain trailer 200-3 is shown traveling away from worksite 10 on road 20. The mobile grain trailer 200-3, having been previously positioned at the unloading zone (or another unloading zone) and filled (at least to a threshold level) by mobile grain cart 200-1, leaves the worksite 10 and travels road 20 on the way to a delivery location (e.g., dryer, storage bin, grain mill, etc.).

Figure 2:
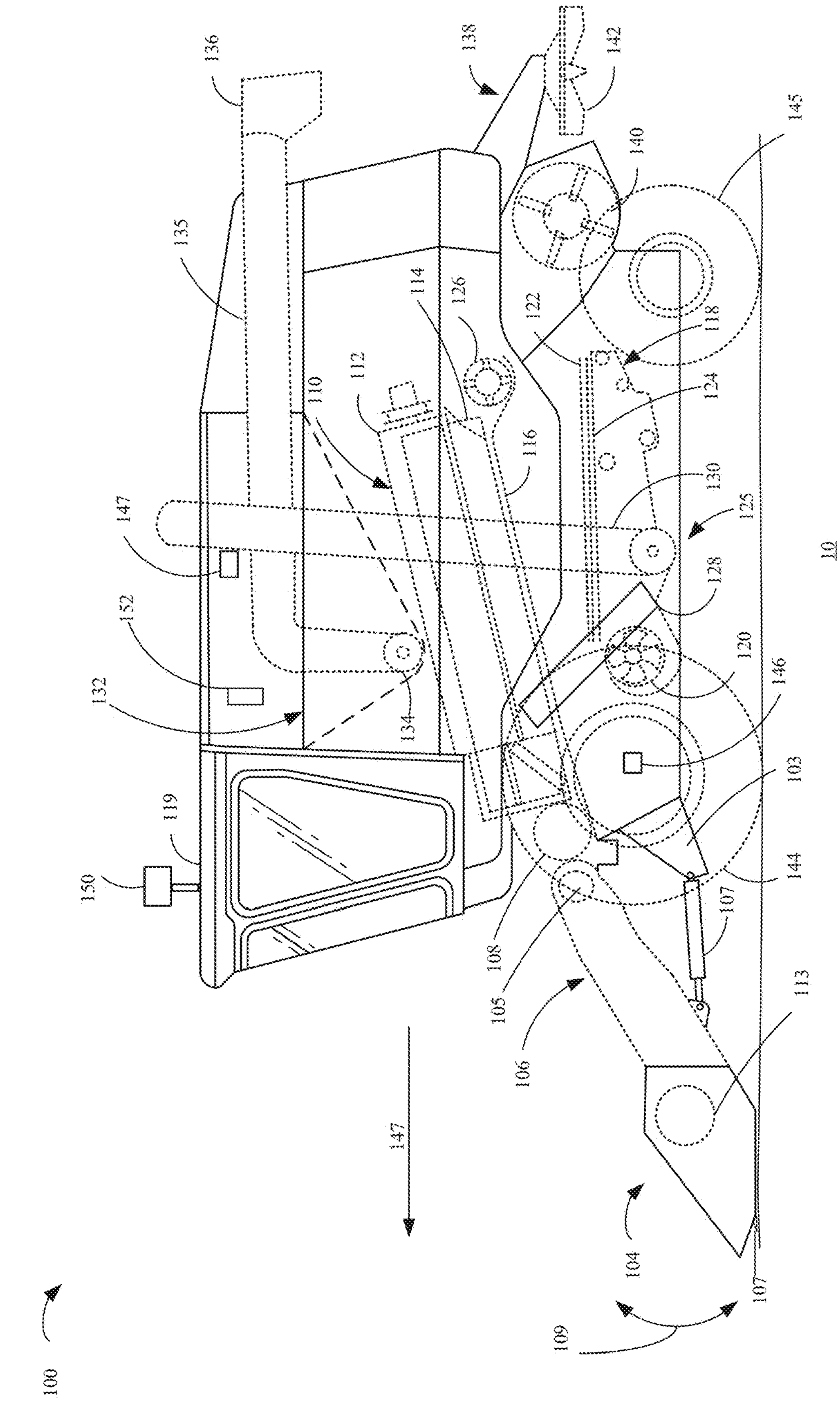
FIG. 2 is a partial pictorial, partial schematic illustration showing an example agricultural harvester.

FIG. 2 is partial pictorial, partial schematic illustration of an example agricultural harvester 100. In the example shown in FIGS. 1-2, agricultural harvester 100 is in the form of a combine harvester. As illustrated in FIG. 2, harvester 100 includes ground engaging traction elements (wheels or tracks) 144 and 145 which can be driven by a propulsion subsystem (e.g., motor or engine and other drivetrain elements, such as a gear box) to propel harvester 100 across a worksite 10 (e.g., a field). Harvester 100 includes an operator compartment or cab 119, which can include a variety of different operator interface mechanisms (e.g., 418 shown in FIG. 4) for controlling harvester 100 as well as for presenting (e.g., displaying, etc.) various information. Harvester 100 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvester 100 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 1, agricultural harvester 100 can also include one or more actuators that operate to apply a tilt angle, a roll angle, or both to the header 104 or portions of header 104.

Agricultural harvester 100 includes a material handling subsystem 125 that includes a thresher 110 which illustratively includes a threshing rotor 112 and a set of concaves 114. Further, material handling subsystem 125 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem also includes discharge beater 126, tailings elevator 128, and clean grain elevator 130. The clean grain elevator moves clean grain into a material receptacle (or clean grain tank) 132.

Harvester 100 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 2) to a variety of deployed positions away from agricultural harvester 100 to align spout 136 relative to a material receptacle of a material receiving machine 200 that is configured to receive the material within grain tank 132. One example of such a deployed position is shown in FIG. 1. Spout 136, in some examples, is also rotatable, by an actuator, to adjust the direction of the material stream exiting spout 136.

Harvester 100 also includes a residue subsystem 138 that can include chopper 140 and spreader 142. In some examples, a harvester within the scope of the present disclosure can have more than one of any of the subsystems mentioned above. In some examples, harvester 100 can have left and right cleaning subsystems, separators, etc., which are not shown in FIG. 1.

In operation, and by way of overview, harvester 100 illustratively moves through a field 10 in the direction indicated by arrow 147. As harvester 100 moves, header 104 engages the crop plants to be harvested and cuts, with a cutter bar 107 on the header 104, the crop plants to generate cut crop material.

The cut crop material is engaged by a cross auger 113 which conveys the severed crop material to a center of the header 104 where the severed crop material is then moved through an opening to a conveyor in feeder house 106 toward feed accelerator 108, which accelerates the severed crop material into thresher 110. The severed crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by one or more cleaning fans 120. Cleaning fans 120 direct air along an airflow path upwardly through the sieves and chaffers. The airflow carries residue rearwardly in harvester 100 toward the residue handling subsystem 138.

Tailings elevator 128 returns tailings to thresher 110 where the tailings are re-threshed. Alternatively, the tailings also can be passed to a separate re-threshing mechanism by a tailings elevator or another transport device where the tailings are re-threshed as well.

Harvester 100 can include a variety of sensors, some of which are illustrated in FIG. 1, such as ground speed sensor 146, one or more mass flow sensors 147, and one or more observation sensor systems 150, and one or more fill level sensors 152.

Ground speed sensor 146 senses the travel speed of harvester 100 over the ground. Ground speed sensor 146 can sense the travel speed of the harvester 100 by sensing the speed of rotation of the ground engaging traction elements 144 or 145, or both, a drive shaft, an axle, or other components. In some instances, the travel speed can be sensed using a positioning system, such as a global positioning system (GPS), a dead reckoning system, a long-range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 100 is on a slope, the orientation of harvester 100 relative to the slope is known. For example, an orientation of harvester 100 could include ascending, descending or transversely travelling the slope.

Mass flow sensors 147 sense the mass flow of material (e.g., grain) through clean grain elevator 130. Mass flow sensors 147 can be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Observation sensor systems 150 can include one or more of a variety of sensors, such as cameras (e.g., mono or stereo cameras), Lidar, Radar, Ultrasonic sensors, as well as various other sensor configured to emit and/or receive electromagnetic radiation, as well as a variety of other sensors. Observation sensor systems 150 can illustratively observe (and thus detect characteristics relative to) the worksite 10, items at the worksite 10 (e.g., vegetation, including crops at the worksite), and portions of the harvester 100. While FIG. 1 shows some example positions of observation sensor system 150, it will be understood that observation sensor systems 150 can, alternatively or additionally, be positioned (or otherwise disposed) at a variety of other locations on harvester 100.

Fill level sensors 152 can include one or more of a variety of sensors, such as contact sensors and non-contact sensors. Fill level sensors 152 detect a fill level of grain in grain tank 132. Fill level sensors 152, in the form of contact sensors, include paddles (or other contact members) that are contacted by the grain and the displacement of the contact members or force or load of impact of the material on the contact member can be detected to determine presence of grain material at the level of the tank corresponding to the sensor. Fill level sensors 152, in the form of non-contact sensors, can be configured to capture electromagnetic radiation to detect presence of grain at the level of the tank corresponding to the sensor. In some examples, fill level sensors 152 are configured to alert an operator when the harvester 100 is full (or is approaching full). These are merely some examples. While FIG. 1 shows some example positions of fill level sensors 152, it will be understood that fill level sensors 152 can, additionally or alternatively, be positioned (or otherwise disposed) at a variety of other locations on harvester 100.

Harvester 100 can include various other sensors.

Figure 3A:
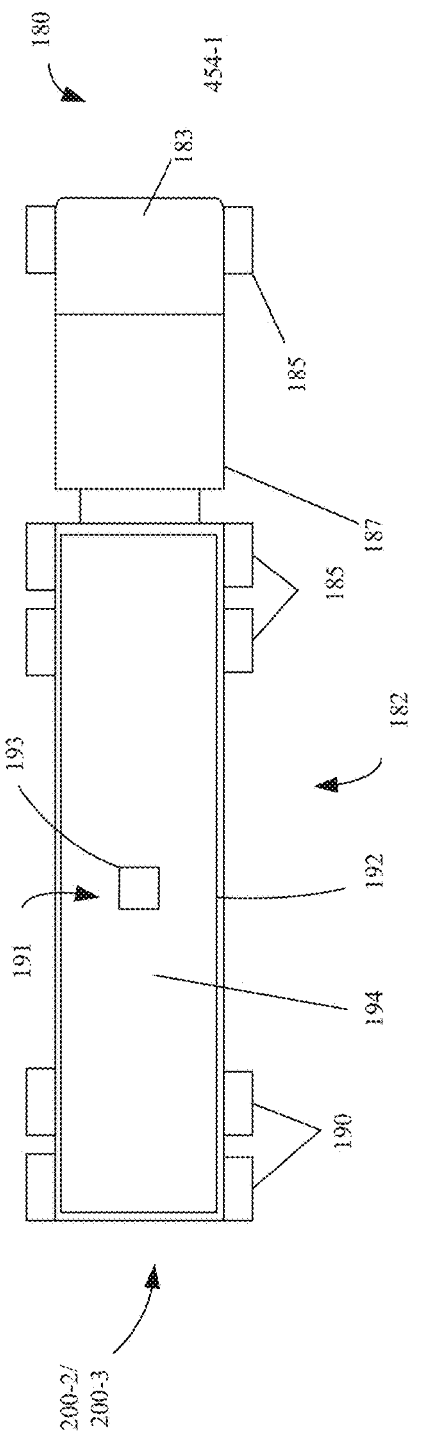
FIGS. 3A-3B are pictorial illustrations showing example material receiving machines.
Figure 3B:
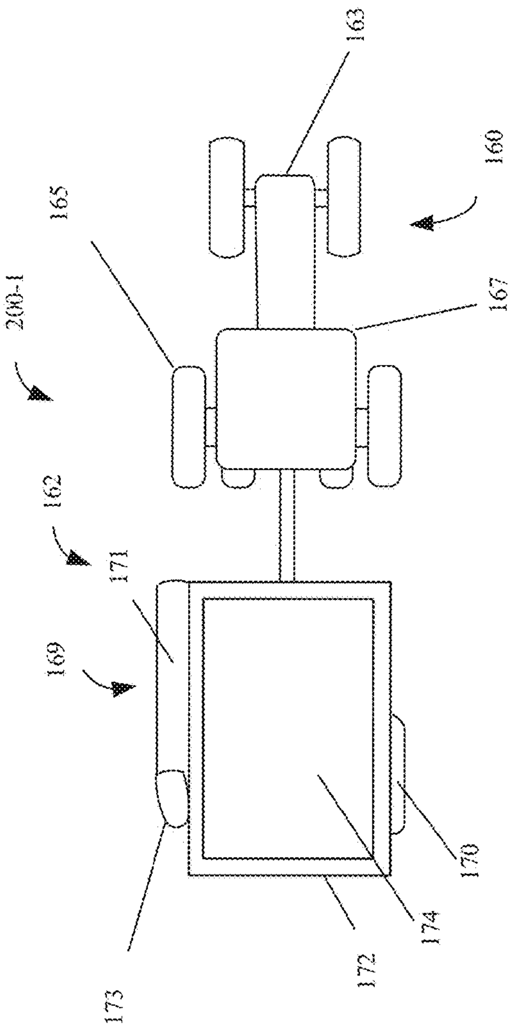

FIGS. 3A-3B are pictorial illustrations of example material receiving machines 200. FIG. 3A shows that a receiving machine 200 can be include a towing vehicle and towed implement, such as a tractor 160 and towed grain cart 162 (e.g., receiving machine 200-1) or a truck (e.g., semi-truck) 170 and trailer (e.g., semi-trailer) 172 (e.g., receiving machine 200-2 or 200-3). Various other forms of receiving machines 200 are contemplated herein.

Tractor 160, as illustrated, includes a power plant 163 (e.g., internal combustion engine, battery and electric motors, etc.), ground engaging elements 165 (e.g., wheels or tracks), and an operator compartment 167. Grain cart 162 is coupled to tractor by way of a connection assembly (e.g., one or more of hitch, electrical coupling, hydraulic coupling, pneumatic coupling, etc.) and, as illustrated, includes ground engaging traction elements 170, such as wheels or tracks, material receptacle 172 which includes a volume 174 for receiving material, such as harvested crop material from agricultural harvester 100. Grain cart 162 also includes a material transfer subsystem 169 which includes a chute 171, a spout 173, and a conveying mechanism, such as an auger or blower (not shown), as well as various actuator(s) (not shown). Material transfer subsystem 169 is actuatable between a storage position (as shown) and a range of deployed positions. Material transfer subsystem 169 can be used to transfer material from material receptacle 172 to another machine such as receiving machine 200-2 or 200-3, an elevator, a grinder, as well as various other machines or locations.

Truck 180, as illustrated, includes a power plant 183 (e.g., internal combustion engine, battery and electric motors, etc.), ground engaging traction elements 185 (e.g., wheels or tracks), and an operator compartment 187. Trailer 182 is coupled to track by way of a connection assembly (e.g., one or more of a hitch, electrical coupling, hydraulic coupling, pneumatic coupling, etc.) and, as illustrated, includes ground engaging traction elements 190, such as wheels or tracks, material receptacle 192 which includes a volume 194 for receiving material, such as harvested crop material from agricultural harvester 100 or another receiving machine, such as receiving machine 200-1. Trailer 182 also includes a material transfer subsystem 191 which includes an actuatable door 193 disposed on the bottom side of trailer 182 as well as various actuator(s) (not shown). Actuatable door 193 is actuatable between an open position and a closed position, such that material in material receptacle 192 can exit material receptacle 192 via door 193. In one example, the interior walls of material receptacle 192 taper towards door 191 such that material exits door 193 via gravity. Thus, material transfer subsystem 191 can be used to transfer material from grain bin 192 to another machine, such as an elevator, as well as to various other machines or to other locations. In other examples, trailer 182 could be a dump or rear tipper trailer, having a rear door, and one or more actuators that actuate to tilt material receptacle such that material exits (or is dumped out of) the rear door. In another example, trailer 182 could be a side tipper trailer, that does not have a door, but has one or more actuators that actuate to tilt the material receptacle such that material exits (or is dumped out of) a side of the material receptacle.

It should be noted that other forms of material transfer subsystems 169 and 191 are contemplated herein and that the illustrated examples are not meant to limit the present disclosure.

Figure 4:
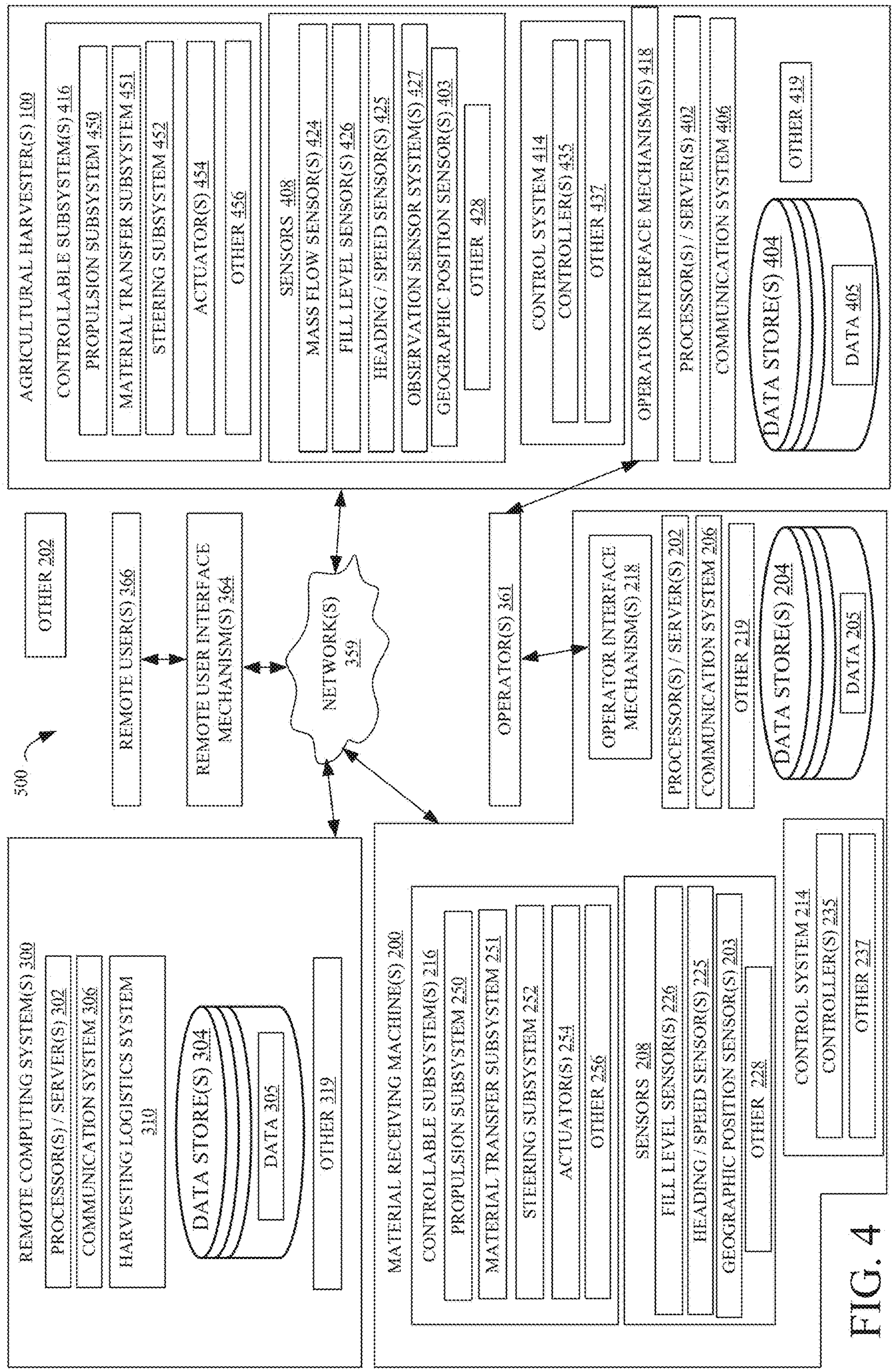
FIG. 4 is a block diagram of one example agricultural harvesting operation system architecture.

The operator compartments 167 and 187 can include one or more operator interface mechanisms (e.g., 218 described in FIG. 4) for controlling the corresponding receiving machine 200 as well as for presenting (e.g., displaying, etc.)

various information. Receiving machines 200 can include various other components as well, some of which will be described below FIG. 4 is a block diagram showing one example agricultural harvesting operation system architecture 500 (hereinafter also referred to as harvesting system 500 or system 500). Harvesting system 500 includes one or more mobile harvesters 100 and one or more mobile material receiving machines 200. Harvesting system 500 also includes one or more remote computing systems 300, one or more networks 359, one or more remote user interface mechanisms 364, and can include a variety of other items 202 as well.

Each agricultural harvester 100, itself, illustratively includes one or more processors or servers 402, one or more data stores 404, communication system 406, one or more sensors 408, control system 414, one or more controllable subsystems 416, one or more operator interface mechanisms 418, and can include various other items and functionality 419 as well.

Each material receiving machine 200, itself, illustratively includes one or more processors or servers 202, one or more data stores 204, communication system 206, one or more sensors 208, control system 214, one or more controllable subsystems 216, one or more operator interface mechanisms 218, and can include various other items and functionality 219 as well.

Remote computing systems 300, as illustrated, include one or more processors or servers 302, one or more data stores 304, communication system 306, harvesting logistics system 310, and can include various other items and functionality 319.

Data stores 204, data stores 304, and data stores 404 each store a variety of data (generally indicated as data 205, data 305, and data 405 respectively), some of which will be described in more detail herein. For example, data 205, data 305, or data 405, or a combination thereof, can include, among other things, yield data, worksite dimensions data, worksite features data, crop characteristics data, terrain data, machine data, such as machine dimensions and machine ratings data, machine assignment data, delivery data, zones data, as well as various other data. Data can be provided by sensors, maps of the worksite, overhead images of the worksite, input by a user or operator, provided by a third-party (e.g., manufacturer, online databases, online resources, etc.), as well as provided in various other ways. Some examples of the various data will be described in more detail in FIG. 5. Additionally, data 205 can include computer executable instructions that are executable by one or more processors or servers 202 to implement other items or functionalities of system 500, including other items or functionalities of material receiving machines 200. Additionally, data 305 can include computer executable instructions that are executable by one or more processors or servers 302 to implement other items or functionalities of system 500, including other items of remote computing systems 300. Additionally, data 405 can include computer executable instructions that are executable by one or more processors or servers to implement other items or functionalities of system 500, including other items or functionalities of agricultural harvesters 100. It will be understood that data stores 204, data stores 304, and data stores 404 can include different forms of data stores, for instance both volatile data stores (e.g., Random Access Memory (RAM)) and non-volatile data stores (e.g., Read Only Memory (ROM), hard drives, solid state drives, etc.).

Sensors 408 can include one or more mass flow sensors 424, one or more fill level sensors 426, one or more heading/speed sensors 425, one or more observation sensors systems 427, geographic position sensors 403, and can include various other sensors 428 as well. The sensor data generated by sensors 408 can be communicated to remote computing systems 300, to material receiving machines 200, to other harvesters 100, and to other items of agricultural harvester 100. Control system 414, itself, can include one or more controllers 435 for controlling various other items of agricultural harvester 100, and can include other items 437 as well. Controllable subsystems 416 can include propulsion subsystem 450, material transfer subsystem 451, steering subsystem 452, actuators 454, and can include various other subsystems 456 as well.

Sensors 208 can include one or more heading/speed sensors 225, one or more geographic position sensors 203, one or more fill level sensors 226, and can include various other sensors 228 as well. The sensor data generated by sensors 208 can be communicated to remote computing systems 300, to agricultural harvesters 100, and to other items of material receiving machines 200. Control system 214, itself, can include one or more controllers 235 for controlling various other items of material receiving machine 200, and can include other items 237 as well. Controllable subsystems 216 can include propulsion subsystem 250, material transfer subsystem 251, steering subsystem 252, actuators 254, and can include various other subsystems 256 as well.

Mass flow sensors 424 detect a mass flow of material (e.g., grain) into a material receptacle (e.g., grain tank 132) of an agricultural harvester 100. The mass flow sensors 424 can comprise one or more impact sensors, positioned in the clean grain elevator 130, that are impacted by material (grain) as the material is flowing into the grain tank 132. In other examples, the mass flow sensors 424 can be other types of flow sensing devices such as non-contact sensors, for instance, electromagnetic (EM) radiation sensing devices that generate EM radiation that is directed through the material flow and receive the EM radiation that flows through or is reflected from the material flow. In one example, mass flow sensors 424 are similar to mass flow sensors 147. These are merely some examples.

Fill level sensors 426 detect a fill level of material (e.g., grain) in a material receptacle (e.g., grain tank 132) of an agricultural harvester 100. The fill level sensors 426 can comprise contact sensors having a contact member configured to be contacted by the grain in the grain tank 132 and the displacement of the contact member or force or load of impact of the material on the contact member can be detected to determine presence of grain material at the level of the tank corresponding to the sensor. Fill level sensors 426 can include weight sensors, such as load cells or strain gauges, that detect a weight of the material in the material receptacle. Fill level sensors 426 can comprise non-contact sensors configured to capture electromagnetic radiation to detect presence of grain at the level of the tank corresponding to the sensor. In one example, fill level sensors 426 are similar to fill level sensors 152. These are merely some examples. Fill level sensors 226 detect a fill level of material (e.g., grain) in a material receptacle (e.g., 172 or 192) of a material receiving machine 200. The fill level sensors 266 can comprise contact sensors having a contact member configured to be contacted by the grain in the material receptacle and the displacement of the contact member or force or load of impact of the material on the contact member can be detected to determine presence of grain material at the level of the material receptacle corresponding to the sensor. Fill level sensors 226 can include weight sensors, such as load cells or strain gauges, that detect a weight of the material in the material receptacle. Fill level sensors 226 can comprise non-contact sensors configured to capture electromagnetic radiation to detect presence of grain at the level of the material receptacle corresponding to the sensor. These are merely some examples.

Observation sensor systems 427 can include one or more of a variety of sensors, such as cameras (e.g., mono or stereo cameras), Lidar, Radar, Ultrasonic sensors, as well as various other sensor configured to emit and/or receive electromagnetic radiation, as well as a variety of other sensors. Observation sensor systems 427 can illustratively observe (and thus detect characteristics relative to) the worksite 10, items at the worksite 10 (e.g., vegetation, including crops at the worksite), and portions of the harvester 100. In one example, observation sensor systems 427 can detect characteristics of crops at a field, such as crop health, crop downing (or crop lodging), that is, downed crop, as well as various other characteristics of the crop. In one example, observation sensor systems 427 are similar to observation sensor systems 150. These are merely some examples.

Heading/speed sensors 425 detect a heading characteristic (e.g., travel direction) or speed characteristic (e.g., travel speed, acceleration, deceleration, etc.), or both, of an agricultural harvester 100. Heading/speed sensors 225 detect a heading characteristic (e.g., travel direction) or speed characteristic (e.g., travel speed, acceleration, deceleration, etc.), or both, of a receiving machine 200 This can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors. Thus, while heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources. Similarly, while heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources.

Geographic position sensors 403 illustratively sense or detect the geographic position or location of an agricultural harvester 100. Geographic position sensors 203 illustratively sense or detect the geographic position or location of a material receiving machine 200. Geographic position sensors 403 and 203 can include, but are not limited to, a global navigation satellite system (GNSS) receiver that receives signals from a GNSS satellite transmitter. Geographic position sensors 403 and 203 can also include a real-time kinematic (RTK) component that is configured to enhance the precision of position data derived from the GNSS signal. Geographic position sensors 403 and 203 can include a dead reckoning system, a cellular triangulation system, or any of a variety of other geographic position sensors.

Sensors 408 can also include various other types of sensors 428. For example, but not by limitation, sensors 428 can include various sensors that detect characteristics of the harvester 100, such as position (e.g., height, depth, etc.) and orientation (e.g., pitch, roll, and yaw) of various components of harvester 100 relative to other components of harvester 100 or relative to the field surface, motion characteristics (e.g., operating speed, such as operating rotational speed) of various components, power characteristics (e.g., power supplied to various components), fluid pressures, etc. In further example, but not by limitation, sensors 428 can include various sensors that detect performance characteristics of the agricultural harvester such as grain loss, time to complete, fuel efficiency, as well as various other types of performance characteristics. Sensors 208 can also include various other types of sensors 228. For example, but not by limitation, sensors 228 can include various sensors that detect characteristics of the material receiving machine 200, such as position (e.g., height, depth, etc.) and orientation (e.g., pitch, roll, and yaw) of various components of material receiving machine 200 relative to other components of material receiving machine 200 or relative to the field surface, motion characteristics (e.g., operating speed, such as operating rotational speed) of various components, power characteristics (e.g., power supplied to various components), fluid pressures, etc. In further example, but not by limitation, sensors 228 can include various sensors that detect performance characteristics of the material receiving machine such as grain loss (e.g., material spill), time to complete, fuel efficiency, as well as various other performance characteristics. Additionally, sensors 228 could include sensors similar to observation sensor systems 427. These are merely some examples.

Control system 414 can include one or more controllers 435 (e.g., electronic control units, which can include or be implemented by one or more processors, such as one or more processors 402) that generate control signals to control one or more components of a harvester 100 or components of system 500, or both. For example, but not by limitation, controllers 435 can include, a communication system controller to control communication system 406, an interface controller to control one or more interface mechanisms (e.g., 418 or 364, or both), a propulsion controller to control propulsion subsystem 450 to control a travel speed of an agricultural harvester 100, a material transfer subsystem controller to control material transfer subsystem 451 to initiate, control, and end material transfer, a path planning controller to control steering subsystem 452 to control a route or heading of an agricultural harvester 100, and one or more actuator controllers to control operation of actuators 454. In other examples, a central controller 435 can be used to generate control signals to control a plurality of the controllable subsystems 416 as well, in some examples, other items of system 500. Control system 214 can include a variety of controllers 235 (e.g., electronic control units, which can include or be implemented by one or more processors, such as one or more processors 202) that generate control signals to control one or more components of a material receiving machine 200 or components of system 500, or both. For example, but not by limitation, controllers 235 can include a communication system controller to control communication system 206, an interface controller to control one or more interface mechanisms (e.g., 218 or 364, or both), a propulsion controller to control propulsion subsystem 250 to control a travel speed of a material receiving machine 200, a material transfer subsystem controller to control material transfer subsystem 251 to initiate, control, and end material transfer, and a path planning controller to control steering subsystem 252 to control a route or heading of a material receiving machine 200. In other examples, a central controller 235 can be used to generate control signals to control a plurality of the controllable subsystems 216 as well, in some examples, other items of system 500.

Propulsion subsystem 450 includes one or more controllable actuators (e.g., internal combustion engine, motors, pumps, gear boxes, etc.) that drive the ground engaging traction elements (e.g., wheels or tracks) of an agricultural harvester 100. Propulsion subsystem 250 includes one or more controllable actuators (e.g., internal combustion engine, motors, pumps, gear boxes, etc.) that drive the ground engaging traction elements (e.g., wheels or tracks) of a material receiving machine 200.

Material transfer subsystem 451 includes one or more controllable actuators (e.g., fluid cylinders or linear actuators, etc.) controllable to adjust position and/or orientation of chute (e.g., 135) and spout (e.g., 136) of a harvester 100. Material transfer subsystem 451 additionally includes one or more controllable actuators (e.g., motors, pumps, etc.) that drive the conveying mechanism (e.g., 134) of a harvester 100. Material transfer subsystem 251 can, in one example (e.g., in the example of mobile grain cart 200-1) can be similar to material transfer subsystem 451 and can include one or more controllable actuators (e.g., fluid cylinders or linear actuators, etc.) controllable to adjust position and/or orientation of chute (e.g., 171) and spout (e.g., 173) of a material receiving machine 200 and one or more controllable actuators (e.g., motors, pumps, etc.) that drive the conveying mechanism (e.g., auger, blower, etc.) of a material receiving machine 200. In another example (e.g., in the example of mobile grain trailer 200-3 or 200-4), material transfer subsystem 251 can include actuators (e.g., fluid cylinders, linear actuators, motors, pumps, etc.) that are controllable to open a door (e.g., 193, rear door, etc.) of the material receiving machine and/or can include actuators (e.g., fluid cylinders, linear actuators, motors, pumps, etc.) that are controllable to tip or tilt the material receptacle.

Steering subsystem 452 includes one or more controllable actuators (e.g., electric actuators, hydraulic actuators, etc.) that are controllably actuatable to control the steering and thus heading of an agricultural harvester 100. Steering subsystem 252 includes one or more actuators (e.g., electric actuators, hydraulic actuators, etc.) that are controllably actuatable to control the steering and thus heading of a material receiving machine 200.

Actuators 454 include a variety of different types of actuators that control operation of one or more components of an agricultural harvester 100. Actuators 454 can include actuators that control the position or orientation of components of an agricultural harvester 100 as well as actuators that control a speed of components of an agricultural harvester 100. Actuators 454 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators. Actuators 254 include a variety of different types of actuators that control operation of one or more components of a material receiving machine 200. Actuators 254 can include actuators that control the position or orientation of components of a material receiving machine 254 as well as actuators that control a speed of components of a material receiving machine 200. Actuators 254 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators.

Communication system 406 is used to communicate between components of an agricultural harvester 100 or with other items of harvesting system 500, such as remote computing systems 300, material receiving machines 200, other agricultural harvesters 100, or user interface mechanisms 364, or a combination thereof. Communication system 206 is used to communicate between components of a material receiving machine 200 or with other items of harvesting system 500, such as remote computing systems 300, agricultural harvesters 100, other material receiving machines 200, or user interface mechanisms 364, or a combination thereof. Communication system 306 is used to communicate between components of a remote computing system 300 or with other items of harvesting system 500, such as agricultural harvesters 100, material receiving machines 200, other remote computing systems 300, or user interface mechanisms 364, or a combination thereof.

Communication systems 206, 306, and 406 can each include one or more of wired communication circuitry and wireless communication circuitry, as well as wired and wireless communication components. In some examples, communication systems 206, 306, and 406 can each be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication systems 206, 306, and 406 can each also include a system that facilitates downloads or transfers of information to and from a secure digital (SD) card or a universal serial bus (USB) card, or both. Communication systems 206, 306, and 406 can each utilize network 359. Networks 359 can be any of a wide variety of different types of networks such as the Internet, a cellular network, a wide area network (WAN), a local area network (LAN), a controller area network (CAN), a near-field communication network, or any of a wide variety of other networks or communication systems.

FIG. 4 also shows that remote computing systems 300 include harvesting logistics system 310 (hereinafter also referred to as logistics system 310 or system 310). Harvesting logistics system 310 obtains various data, including yield data, worksite dimensions data, worksite features data, crop characteristics data, terrain data, machine data, such as machine dimensions and machine ratings data, machine assignment data, delivery data, zones data, as well as various other data, and generates one or more harvesting logistics outputs that can be used in the control of one or more harvesters 100 or one or more material receiving machines 200, or both, as well as in the control of one or more other items, such as remote user interface mechanisms 364 to generate presentations (e.g., displays, etc.) based on (or indicative of) the one or more harvesting logistics outputs. Additionally, it will be understood that control of the one or more harvesters 100 and control of the one or more material receiving machines 200 can include controlling one or more interface mechanisms (e.g., 418 and 218, respectively) to generate presentations (e.g., displays, etc.) based on (or indicative of) the one or more harvesting logistics outputs. The harvesting logistics outputs can include one or more harvest zones (sub-areas of the field to be harvested, which can include an indication of order), one or more material transfer locations (sub-areas of the field, generally in the harvest zones, at which a material receiving machine, such as a mobile grain cart, will receive harvested material from a harvester, which can include an indication of order), one or more unloading zones (sub-areas of the worksite at which a material receiving machine that is to carry harvested material away from the worksite, such as a mobile grain trailer, will receive harvested material, which can include an indication of order), one or more timing indicators (describing the time(s) at which a machine is to be at a given location or zone), one or more machine routes, one or more presentations of the logistics output (e.g., maps, etc.), as well as other items. Harvesting logistics 310 will be described in greater detail below.

One example of a presentation based on the one or more harvesting logistics outputs includes an indication (e.g., displayed indication, turning on a light (e.g., green light), etc.) on an interface mechanism 218 of a material receiving machine 200 in the form of a mobile grain trailer that indicates when the mobile grain trailer is located in an unloading zone. Such an indication could be helpful to an operator of the mobile grain trailer when attempting to position the mobile grain trailer in the unloading zone. For example, based on geographic location data generated by geographic position sensors 203 and a harvesting logistics output including, at least, a location of an unloading zone at the worksite, a control system 214 can control an interface mechanism 218 to generate the indication.

FIG. 4 also shows remote users 366 interacting with agricultural harvesters 100, material receiving machines 200, and remote computing systems 300 through user interface mechanisms 364 over networks 359. In some examples, user interface mechanisms 364 can include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the users 366 can interact with user interface mechanisms 364 using touch gestures. Additionally, at least some of the user interface mechanisms 364 can be used to present (e.g., display, audible presentation, haptic presentation, etc.) various information, including information based on (or indicative of) the one or more harvesting logistics outputs. These examples described above are provided as illustrative examples and are not intended to limit the scope of the present disclosure. Consequently, other types of user interface mechanisms 364 can be used and are within the scope of the present disclosure.

FIG. 4 also shows that one or more operators 361 can operate agricultural harvesters 100 and material receiving machines 200. The operators 361 interact with operator interface mechanisms 418 or operator interface mechanisms 218. In some examples, operator interface mechanisms 418 and operator interface mechanisms 218 can each include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the operators 361 can interact with operator interface mechanisms 418 and operator interface mechanisms 218 using touch gestures. Additionally, at least some of the operator interface mechanisms 418 and operator interface mechanisms 218 can be used to present (e.g., display, audible presentation, haptic presentation, etc.) various information, including information based on (or indicative of) the one or more harvesting logistics outputs. These examples described above are provided as illustrative examples and are not intended to limit the scope of the present disclosure. Consequently, other types of operator interface mechanisms 418 and operator interface mechanisms 218 can be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, agricultural harvesters 100 can be controlled remotely by remote computing systems 300 or by remote users 366, or both. In one example, material receiving machines 200 can be controlled remotely by remote computing systems 300 or by remote users 366, or both. In some examples, operators 361 are on-board (e.g., in an operator compartment, such as a cab) the machines (e.g., 100 or 200). In some examples, operators 361 are remote from the machines (e.g., 100 or 200) and control the machines through one or more interface mechanisms (e.g. one or more of 418 and one or more of 218) which are remote from the machines but operatively coupled (e.g., communicatively coupled, such as over networks 359) to the machines.

It will be understood that, in some examples, items in system 500 can be distributed in various ways, including ways that differ from the example shown in FIG. 4. For example, but not by limitation, harvesting logistics system 310, shown in FIG. 4 as being disposed on remote computing systems 300, can additionally, or alternatively, be located elsewhere, such as at one or more agricultural harvesters 100 or one or more material receiving machines 200, or both.

Figure 5:
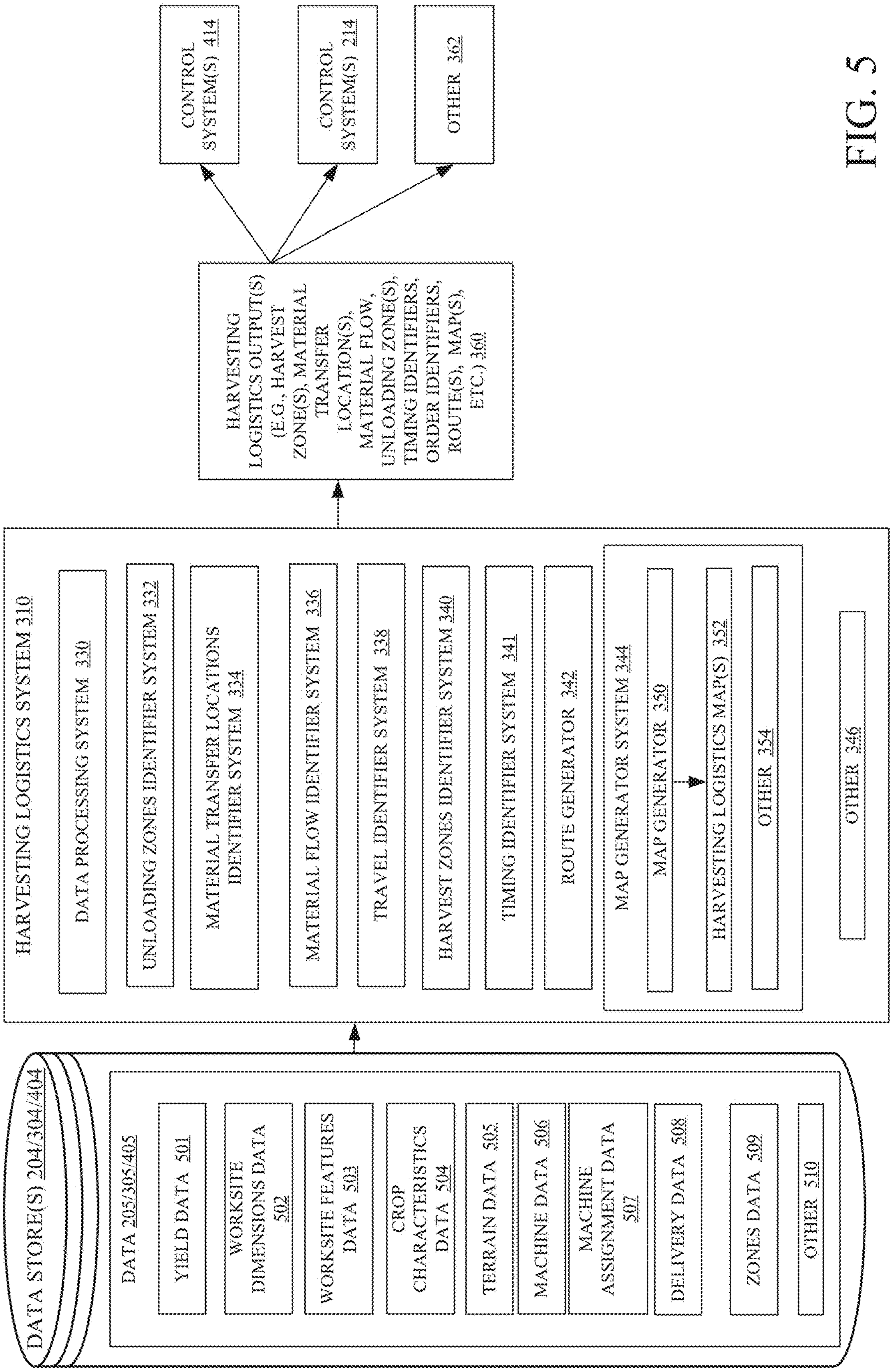
FIG. 5 is a block diagram showing some examples of components of the agricultural harvesting operation system architecture, including harvesting logistics system, in more detail.

FIG. 5 is a block diagram that shows examples of some of the components of system 500 in more detail and information flow between the components.

As illustrated in FIG. 5, it can be seen that data stores 204, data stores 304, data stores 404, or a combination thereof, can include as data (205, 305, and 405, respectively), yield data 501, worksite dimensions data 502, worksite features data 503, crop characteristics data 504, terrain data 505, machine data 506, machine assignment data 507, delivery data 508, zones data 509, and include various other data 510, including, but not limited to, other data described elsewhere herein. In some examples, where the data is located can depend on where harvesting logistics system 310 (also called logistics system 310 or system 310) is located. Data 501, 502, 503, 504, 505, 506, 507, 508, 509, and 510 can be collectively referred to herein as harvesting logistics data.

As shown in FIG. 5, logistics system 310 includes data processing system 330, unloading zones identifier system 332, material transfer locations identifier system 334, material flow identifier system 336, travel identifier system 338, harvest zones identifier system 340, timing identifier system 341, route generator 342, map generator system 344, and can include various other items and functionality 346 as well. Map generator system 344, itself, includes map generator that generates one or more harvesting logistics maps 352. Map generator system 344 can include various other items 354 as well. As will be described in more detail, system 310 is operable to generate one or more harvesting logistics outputs 360.

Yield data 501 includes data indicative of yield (crop yield) at the one or more fields of the worksite at which a harvesting operation is to be (or is being) conducted. Yield data 501 can indicate yield values at different locations across the one or more fields. Yield data 501 can be derived from a variety of sources including, but not limited to, overhead (e.g., satellite, etc.) images of the field(s) (e.g., spectral images, such as vegetation index images (e.g., normalized difference vegetation index (NDVI) images, etc.)), sensor data generated during prior operations at the field(s) during the same growing season, historical yield values (e.g., from one or more prior harvesting operations), operator or user input, as well as from a variety of sources. Additionally, it will be understood that the yield data 501 can be generated or updated (or corrected) based on sensor data generated during the harvesting operation, such as by sensors on-board a harvester 100 (e.g., mass flow sensors 424, fill level sensors 426, etc.).

Worksite dimensions data 502 includes data indicative of dimensions (e.g., length, width, area (e.g., acreage), etc.) of the worksite at which a harvesting operation is to be (or is being) conducted, including, individualized dimensions for sub-areas of the worksite, such as field dimensions, headland (or turnrow dimensions), ditch dimensions, road dimensions, field entrance/exit dimensions, etc. Worksite dimensions data 502 can be derived from a variety of sources, including, but not limited to, maps of the worksite, overhead (e.g., satellite, etc.) images of the worksite, sensor data generated during prior operations at the worksite (e.g., tracked geographic position data of machines), publicly available sources, operator or user input, as well as a variety of other sources. It will also be understood that the worksite dimensions data 502, in addition to describing dimensionality of sub-areas of the worksite, can also describe the boundaries and locations of the sub-areas, including the locations of the sub-areas relative to each other. Additionally, it will be understood that the worksite dimensions data 502 can be generated or updated (or corrected) based on sensor data generated during the harvesting operation, such as by sensors on-board a harvester 100 (e.g., geographic position sensors 403, etc.) or on-board material receiving machines 200 (e.g., geographic position sensors 203, etc.), or both.

Worksite features data 503 includes data indicative of features (e.g., obstacles, items, etc.) at the worksite at which a harvesting operation is to be (or is being) conducted, such as trees, rocks, water features (e.g., ponds, waterways, etc.), irrigation equipment, telephone poles, fences, as well as a variety of other items. Worksite features data 503 can be derived from a variety of sources, including, but not limited to, maps of the worksite, overhead (e.g., satellite, etc.) images of the worksite, sensor data generated during prior operations at the worksite (e.g., images, optical sensor data, etc. indicative of worksite features), operator or user input, as well as a variety of other sources. Additionally, it will be understood that the worksite features data 503 can be generated or updated (or corrected) based on sensor data generated during the harvesting operation, such as by sensors on-board a harvester 100 (e.g., observation sensor systems 427, etc.) or on-board material receiving machines 200 (e.g., sensors 228, etc.), or both.

Crop characteristics data 504 includes data indicative of one or more crop characteristics of crop at the one or more fields of the worksite at which a harvesting operation is to be (or is being) conducted. Crop characteristics can include any of a variety of crop characteristics, such as crop moisture, crop constituent (e.g., protein, oil, starch, etc.) concentrations, crop quality, crop height, downed crop or crop lodging, as well as any of a variety of other crop characteristics. Crop characteristics data 504 can indicate values of one or more crop characteristics at different locations across the one or more fields. Crop characteristics data 504 can be derived from a variety of sources including, but not limited to, overhead (e.g., satellite, etc.) images of the field(s) (e.g., spectral images, such as vegetation index images (e.g., normalized difference vegetation index (NDVI) images, etc.)), sensor data generated during prior operations at the field(s) during the same growing season, historical crop characteristics values (e.g., from one or more operations conducted in previous years), operator or user input, as well as from a variety of sources. Additionally, it will be understood that the crop characteristics data 504 can be generated or updated (or corrected) based on sensor data generated during the harvesting operation, such as by sensors on-board a harvester 100 (e.g., observation sensor systems 427, other sensors 428, etc.).

Terrain data 505 includes data indicative of one or more terrain characteristics (e.g., elevation, slope, soil moisture, soil type, soil compaction, etc.) of the worksite at which a harvesting operation is to be (or is being) conducted, including individualized terrain characteristics for sub-areas of the worksite. Terrain data 505 can indicate values of one or more terrain characteristics at different locations across the one or more fields. Terrain data 505 can be derived from a variety of sources including, but not limited to, overhead (e.g., satellite, etc.) images (or other overhead sensor data) of the worksite (e.g., lidar sensor data, radar sensor data, etc.)), sensor data generated during prior operations at the worksite during the same growing season, historical terrain characteristic values (e.g., from one or more operations conducted in previous years), operator or user input, as well as from a variety of sources. Additionally, it will be understood that the terrain data 505 can be generated or updated (or corrected) based on sensor data generated during the harvesting operation, such as by sensors on-board a harvester 100 or sensors on-board a material receiving machine 200, or both.

Machine data 506 includes data indicative of one or more machine characteristics of the machines that are to perform (or are performing) the harvesting operation at the worksite. Machine data 506 can include data indicative of the type of machine (e.g. model, etc.), data indicative of the dimensions of the machine (e.g., material receptacle/material carrying capacity, etc.), machine ratings (e.g., rated speed, rated speeds with full or empty material receptacles, turn radius, etc.), locations of components of the machines (e.g., location and extension directionality of the chute and spout of material transfer subsystem of machine, etc.), as well as various other machine characteristics. Machine data 506 can be derived from a variety of sources including, but not limited to, dealer or manufacturer provided information, operator or user input, historical performance data (e.g., sensor data from historical operations, etc.), as well as from a variety of other sources.

Machine assignment data 507 includes data indicative of the distribution (or assignment) of machines that are to perform (or are performing) the harvesting operation at the worksite. This can include indicating the number of each type of machine (e.g., the number of mobile grain carts, the number of mobile grain trailers, the number of harvesters, etc.) as well as indicating if the machines are assigned to a particular area of the field (e.g., harvester assigned to one or more specific harvest zones, etc.), to a particular machine (e.g., a mobile grain cart assigned to a particular harvester, etc.), to a particular delivery location (e.g., a mobile grain trailer assigned to deliver to a particular delivery location, etc.), as well as various other machine assignment data. Machine assignment data 507 can be derived from a variety of sources including, but not limited to, operator or user input, sensor data (e.g., geographic position sensor data, etc.), as well as from a variety of other sources.

Delivery data 508 includes data indicative of characteristics of away-from-worksite delivery relative to the harvesting operation to be performed (or being performed). Delivery data 508 can include data that indicates a location of each of one or more delivery locations, including, a location relative to the worksite (e.g., a distance from the worksite, etc.). Delivery data 508 can include data that indicates pathways to each of one or more delivery locations as well as speed limits of those pathways. Delivery data 508 can include data that indicates material capacities of delivery locations, such as total material capacities and remaining material capacities. Delivery data 508 can include data that indicates a completion time, that is, the amount of time it takes to complete deliveries at delivery locations. The completion time can include waiting time and active unloading time. Delivery data 508 can include any of a variety of other data indicative of characteristics of away-from-worksite delivery. Delivery data 508 can be derived from a variety of sources including, but not limited to, operator or user input, sensor data (e.g., sensor data from historical delivery operations, sensor data from delivery operations during current operation, etc.), mapping/navigation information, as well as a variety of other sources.

Zones data 509 includes data indicative of criteria for the identification and selection of zones (e.g., harvest zones and unloading zones). Zones data 509 can be derived from a variety of sources including, but not limited to, operator or user input, as well as a variety of other sources. For example, zones data 509 can include preset (e.g., by an operator, by a user, or in another way) unloading zones. For example, zones data 509 could include a plan, provided by an operator or user, or provided in another way, that presets the unloading zones. Zones data 509 can include criteria for the selection of unloading zones, such as performance criteria (e.g., time to complete, fuel efficiency, down time, cost, machine wear, etc.), as well as other criteria. Zones data 509 can also include criteria for the selection of harvest zones, such as performance criteria (e.g., time to complete, fuel efficiency, down time, cost, machine wear, etc.), harvest priority based on yield, harvest priority based on crop characteristics (e.g., moisture, constituent concentrations, etc.), as well as other criteria. Zones data 509 can include operator or user selection input selecting one or more harvest zones, of a plurality of harvest zones. For instance, in some examples, as will be described below, harvest zones identifier system 340 can output a plurality of potential harvest zones (as well as data relative to the plurality of potential harvest zones) and an operator or user can input a selection of one or more of the plurality of potential harvest zones. Criteria can be used in the identification or selection of zones, including selection of one or more zones amongst a plurality of options.

Data processing system 330 processes yield data 501, worksite dimensions data 502, worksite features data 503, crop characteristics data 504, terrain data 505, machine data 506, machine assignment data 507, delivery data 508, zones data 509, and other data 510 to generate processed data. The processed data can include computer readable values, useable (or readable) by other items of harvesting logistics system 310. Data processing system can include various processing functionality, including image processing functionality, sensor signal processing functionality, filtering functionality, categorization functionality, normalization functionality, aggregation functionality, color extraction functionality, analog-to-digital conversion functionality, as well as various other data processing functionalities.

Unloading zones identifier system 332 is operable to identify one or more unloading zones for the worksite (e.g., sub-areas of the worksite at which a material receiving machine that is to carry harvested material away from the worksite, such as a mobile grain trailer, will receive harvested material), as well, in some examples, an order by which the one or more unloading zones are to be operated at, based on one or more items of data 205/305/405. For example, unloading zones identifier system 332 is operable to identify one or more unloading zones for the worksite, as well, in some examples, an order by which the one or more unloading zones are to be operated at based on one or more of worksite dimensions data 502 (e.g., location and dimensions of worksite or sub-areas of the worksite), worksite features data 503, terrain data 505 (e.g., topographic characteristics, etc.), machine data 506 (e.g., machine dimensions and capacities, machine ratings, such as turn radius, etc.), machine assignment data 507, and delivery data 508. In some examples, unloading zones identifier system 332 identifies the one or more unloading zones, as well, in some examples, the order by which the one or more unloading zones are to be operated at based on zones data 509, for instance, zones data 509 establishing preset unloading zones. In some examples, unloading zones identifier system 332 identifies the one or more unloading zones, as well, in some examples, the order by which the one or more unloading zones are to be operated at based on zones data 509 and one or more other items of data 205/305/405, for instance, zones data 509 establishing unloading zone criteria and one or more of worksite dimensions data 502 (e.g., location and dimensions of worksite or sub-areas of the worksite), worksite features data 503, terrain data 505 (e.g., topographic characteristics, etc.), machine data 506 (e.g., machine dimensions and capacities, machine ratings, such as turn radius, etc.), machine assignment data 507, and delivery data 508.

Route generator 342 is operable to generate one or more routes for the one or more receiving machines 200 (e.g., mobile grain trailers, etc.) based, at least, on the unloading zones identified by unloading zones identifier system 332. As will be discussed below, route generator 342 can also take into account the location(s) of delivery location(s), the pathway(s) to and from the delivery location(s), and the location(s) of field entrance(s)/exit(s).

Harvest zones identifier system 340 is operable to identify one or more harvest zones (e.g., sub-areas of the field at which a harvester is to harvest crop), as well, in some examples, an order of the one or more harvest zones, based on one or more items of data 205/305/405 as well as the unloading zones and material receiving machine routes.

Initially, harvest zones identifier system 340 identifies a plurality of potential harvest zones and will select one or more of the potential harvest zones as selected (i.e., to be used in the operation) harvest zones, as will be described below. For example, harvest zones identifier system 340 can identify a plurality of potential harvest zones or possible harvest zones given the unloading zones and given other characteristics. For example, characteristics indicated by yield data 501, such as the yield values of the field. In further example, characteristics indicated by crop characteristics data 504, such as crop moisture, crop constituents concentrations, crop quality, crop height, downed crop, as well as various other characteristics based on crop characteristics data 504. In further example, characteristics indicated by machine data 506 such as turn radius requirements of the receiving machine to be positioned at unloading zone, such as the mobile grain trailer, turn radius requirements of machine(s) that will approach the receiving machine positioned at the unloading zone, the location and extension directionality of the chute/spout of the machine(s) that will transfer material to the receiving machine positioned at the unloading zone, dimensions of the machines, as well as other characteristics based on machine data 506. In further example, characteristics based on worksite dimensions data 502 such as location and dimension of headlands, location and dimensions of ditches, locations and dimensions of field entrances/exits, as well as other characteristics based on worksite dimensions data 502. In further example, characteristics based on terrain data 505 such as topographic characteristics (e.g., slope, elevation, etc.) of the worksite, soil moisture, compaction/compaction susceptibility of the worksite, as well as other characteristics based on terrain data 505. In further example, characteristics based on worksite features data 503, such as the location of obstacles and other features at the worksite. It will be understood that harvest zones identifier system 340 can identify a plurality of potential harvest zones or possible harvest zones given various other items of data 205/305/405 as well as items or information output by other items of system 310, some examples of which will be described below.

It will be understood that harvest zones identifier system 340 selects one or more of the plurality of potential (or possible) harvest zones based on other characteristics or other items or information output by other items of system 310 and, in some examples, based on selection criteria. In some examples, the harvest zones identifier system 340 can provide a plurality of potential (or possible) harvest zones for operator or user selection.

Route generator 342 is operable to generate one or more routes for one or more harvesters 100 or material receiving machines 200, or both, based, at least, on the harvest zones identified by harvest zones identifier system 340. It will be understood that a route for a harvester can include a plurality of harvest passes (passes along which the harvester harvests) including an initial harvesting pass. In some examples, the initial harvest pass at a field or a harvest zone may be a breakthrough (or opening) harvest pass that opens or breaks through the field or the harvest zone, or both (opens up or breaks through the unharvested crop). In some examples, the initial harvest pass of the zone may not be a breakthrough pass, for example, the initial harvest pass may follow alongside already harvested crop of a previous harvest zone. Additionally, it will be understood that a route for a harvester can also include a turn pattern (e.g., zig-zag, concentric, spiral-in, spiral-out, etc.).

Material transfer locations identifier system 334 is operable to identify one or more material transfer locations (e.g., locations at (or along) which a material receiving machine 200, such as a mobile grain cart, will receive harvested material from a harvester 100) as well, in some examples, an order of the one or more material transfer locations, based on one or more items of data 205/305/405, as well as the harvester routes and harvest zones. For example, but not by limitation, material transfer locations identifier system 334 is operable to identify one or more material transfer locations based on the harvest zone(s), the harvester route(s), yield data 501 (e.g., yield of crop in a harvest zone along a route of the harvester), and machine data 506 (e.g., material receptacle/material carrying capacity of a harvester 100). In some examples, the capacity can instead be defined by a set level (e.g., input by an operator or user, or provided in other ways) that defines the level to which the harvester is to be filled to (which can be less than the actual physical capacity of the harvester 100). It will be understood that a material transfer location can be a location at which the machines will be positioned or can be a location along which the machines will travel (e.g., during in-tandem material transfer).

Route generator 342 is operable to generate one or more routes for one or more material receiving machines 200 (e.g., one or more mobile grain carts) based, at least, on the material transfer locations identified by material transfer locations identifier system 334. As will be discussed below, route generator 342 can also take into account the one or more unloading zones identified by unloading zone identifier system 332.

Material flow identifier system 336 is operable to identify a material flow (or material flow rate) (e.g., a rate at which material will be available for transfer to a material receiving machine, such as a mobile grain trailer, at an unloading zone), based on one or more items of data 205/305/405, as well as the material transfer locations and unloading zones (e.g., potential unloading zones). For example, but not by limitation, material flow identifier system 336 is operable to identify material flow based on the material transfer locations, unloading zones, machine assignment data 507 (e.g., indicating the type and number of material receiving machines assigned to the operation, etc.), machine data 506 (e.g., indicating the material receptacle/carrying capacity of the material receiving machines, the rated travel speeds of the machines (e.g., material receiving machines) at full and empty, etc.), and delivery data 508 (e.g., indicating the location and distance to delivery locations, etc.). It will be understood that the material flow can indicate or be used to determine the timing of when material will be available for transfer at an unloading zone and thus, can indicate or be used to determine the timing of when a receiving machine should be at the unloading zone.

Travel identifier system 338 is operable to identify travel duration of the machines in the operation, including, for example, the travel duration of the material receiving machines 200, based on one or more items of data 205/305/405 as well as based on material transfer locations, unloading zones and routes generated by route generator 342. For example, but not by limitation, travel identifier system 338 is operable to identify travel duration based on material transfer locations, unloading zones, routes, machine data 506 (e.g. the rate travel speeds of the machines (e.g., material receiving machines) at full and empty, etc.), and delivery data 508 (e.g., locations of and distances to delivery locations, travel speed limits of pathways, etc.). For example, for a material receiving machine 200, such as a mobile grain trailer, the travel durations can be based on the location(s) of the unloading zone(s), the location(s) of and distance(s) to the delivery location(s), routes, and expected travel speeds (e.g., the rated travel speeds, the allowed travel speeds, or both). In another example, for a material receiving machine 200, such as a mobile grain cart, the travel duration can be based on the location(s) of the material transfer location(s), the location(s) of the unloading zone(s), routes, and expected travel speeds (e.g., the rated travel speeds, allowed travel speeds, or both).

Harvest zones identifier system 340 is operable to select one or more of the plurality of potential harvest zones and indicate their order based on one or more items of data 205/305/405 and based on routes, travel durations, material flow, material transfer locations, and unloading zones. In some examples, harvest zones identifier system 340 is operable to select one or more of the plurality of potential harvest zones based on harvest zone selection criteria indicated by zones data 509, for example, select the one or more potential harvest zones that optimize a performance category. In other examples, the plurality of potential harvest zones can be output for presentation (e.g., display, etc.) to an operator or user, along with information relative to the one or more harvest zones (e.g., associated performance metrics, etc.), and the operator or user can provide a selection input (stored as zones data 509) and, based upon which, harvest zones identifier system 340 is operable to select the one or more harvest zones (as identified by the operator or user unloading zones selection input).

Timing identifier system 341 is operable to determine timing indicating a time at which a material receiving machine 200, such as a mobile grain trailer, is to be at an unloading zone, based on identified material flow. The determined timing (or time) can be output and used in the control of a receiving machine 200, such as a mobile grain trailer, or presented to the operator 361 thereof, or both.

Map generator system 344 is operable to produce one or more harvesting logistics map(s) 352 based on one or more of harvest zones, material transfer locations, unloading zones, and routes. A harvesting logistics map 352 is a map of a worksite (or at least a portion of the worksite) that can include indicators indicative of one or more items (e.g., harvest zones, material transfer locations, unloading zones, routes, worksite features, headlands, roads, entrance(s)/exit(s), crop area, harvesters, material receiving machines, timing, order, etc.) at their locations in the worksite. In one example, map generator 334 can utilize a prior map of the worksite and overlay (or otherwise incorporate) the indicators. In some examples, map generator 350 can generate different harvesting logistics maps 352 for the different types of machines in the underway or upcoming operation. For instance, in some examples, it can be preferable that a map presented to an operator of material receiving machine not include all the same information as a map presented to an operator of a harvester, and vice-versa. Harvesting logistics maps 352 can be output, as part of harvesting logistics outputs 360.

It can be seen that system 310 is operable to produce one or more harvesting logistics outputs 360. A harvesting logistics output 360 can include one or more harvest zones, one or more material transfer locations, one or more material flow indications, one or more unloading zones, one or more timing identifiers, one or more order identifiers, one or more routes, one or more harvesting logistics maps, and one or more other items as well. A harvesting logistics output 360 can be used in the control of one or more mobile work machines (e.g., one or more harvesters 100 and one or more material receiving machines 200). For example, a harvesting logistics output 360 can be obtained (e.g., retrieved or received) by one or more control systems 414 to control one or more harvesters 100 (e.g., one or more controllable subsystems 416, etc.) and by one or more control systems 214 to control one or more material receiving machines 200 (e.g., one or more controllable subsystems 216, etc.). Additionally, or alternatively, a harvesting logistics output 360 can be presented to one or more operators or one or more users, or both. For example, a harvesting logistics output 360 can be obtained (e.g., retrieved or received) by one or more control systems 414 to control one or more interface mechanisms 418 to present (e.g., display, etc.) information of (or based on) the harvesting logistics output 360 to one or more operators 361 of one or more harvesters 100 and by one or more control systems 214 to control one or more interface mechanisms 218 to present (e.g., display, etc.) information of (or based on) the harvesting logistics output 360 to one or more operators 361 of one or more material receiving machines 200. Additionally, or alternatively, a harvesting logistics output 360 can be obtained (e.g., retrieved or received) by various other items and used in various other ways. For example, but not by limitation, a harvesting logistics output 360 can be obtained (e.g., retrieved or received) by one or more other items 367, such as one or more interface mechanisms 364 which can present (e.g., display, etc.) information of (or based on) the harvesting logistics output 360 to one or more users 366.

Figure 6:
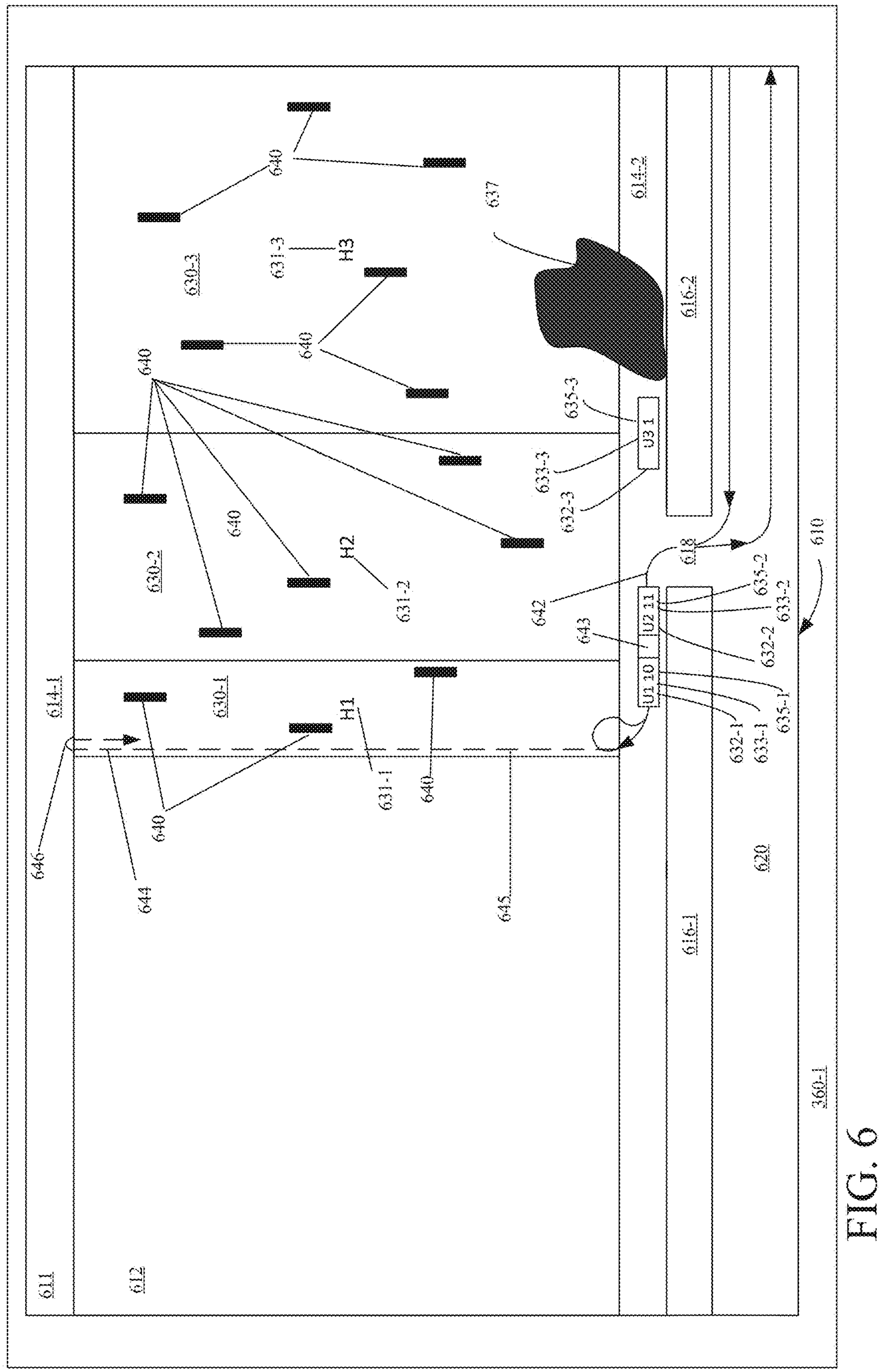
FIG. 6 is a pictorial illustration showing one example harvesting logistics output.

FIG. 6 is a pictorial illustration showing one example of a harvesting logistics output 360 (illustratively 360-1). As shown in FIG. 6, harvesting logistics output 360-1 is in the form of a display (displayable on one or more interface mechanisms 218, 418, or 364, or a combination thereof), specifically a display of a harvesting logistics map 352. As illustrated, harvesting logistics output 360-1 includes a displayed worksite portion 610 that includes field portion 611 (corresponding to a field of the worksite), crop area portion 612 (corresponding to area of the field to be harvested or currently being harvested), headland portions 614 (corresponding to headlands of the field and illustratively shown as 614-1 and 614-2), ditch portions 616 (corresponding to ditches adjacent to the field and illustratively shown as 616-1, 616-2), field entrance/exit portion 618 (corresponding to entrances to and exits from the field), and road portion 620 (corresponding to a road adjacent to the field). As illustrated, harvesting logistics output 360-1 further includes a plurality of harvest zone indicators 630 (illustratively 630-1, 630-2, and 630-3), harvest zone schedule indicators 631 (illustratively 631-1, 631-2, and 631-3), unloading zone indicators 632 (illustratively 632-1, 632-2, and 632-3), unloading zone schedule indicators 633 (illustratively 633-1, 633-2, and 633-3), unloading zone timing indicators 635 (illustratively 635-1, 635-2, and 635-3), worksite feature indicator 637, transfer location indicators 640, route indicator 642, and route indicator 644.

A brief background of the operation and worksite relative to the example shown in FIG. 6 will now be discussed. As can be seen, the worksite includes a single field entrances/exit, indicated by 618. The field (represented by 611) includes headlands (represented by 614-1 and 614-2) that have either been previously harvested or were not planted. The headlands do not provide enough room for the material receiving machines 200, such as mobile grain trailers, to turn around in and thus, the mobile grain trailers have to utilize other areas of the worksite to turn around, such as crop area 612.

System 310 has determined three unloading zones (represented by 632-1, 632-2, and 632-3) based on one or more items of data 205/305/405 as previously described in FIG. 5. The first unloading zone 632-1 (as represented by unloading zone schedule indicator 633-1, illustratively shown as U1) is at approximately the center of the field and near the entrance/exit 618 which helps to minimize the travel time to and from the unloading zone. As the headlands do not provide room for a mobile grain trailer to turn around, system 310 has established a first harvest zone 630-1 (as represented by harvest zone schedule indicator 631-1, illustratively shown as H1), based on the first unloading zone 632-1 and to provide harvested area on crop area 612 for the mobile grain trailer to turn around on crop area to park at the first unloading zone 632-1. The arrival of the mobile grain trailer will have to be spaced from the arrival of the harvester to allow time for the harvester to harvest enough of the first harvest zone 630-1 to provide turn-around space for the mobile grain trailer. Thus, system 310 has identified a timing requirement for the mobile grain trailer relative to the first unloading zone 632-1. The timing requirement is represented by unloading zone timing indicators 635-1. As can be seen, system 310 has identified that a mobile grain trailer should be at the first unloading zone 632-1 at 10:00 AM (as indicated by 635-1, illustratively shown as 10).

System 310 has identified a plurality of material transfer locations (represented by 640) within the first harvest zone 630-1 based on one or more items of data 205/305/405 as previously described in FIG. 5, such as, but not limited to, yield data 503.

The second unloading zone 632-2 (as represented by unloading zone schedule indicator 633-2, illustratively shown as U2) is to be used after the completion of the first harvest zone 630-1. System 310 identifies the second unloading zone 632-2 in a similar location as the first unloading zone 632-1 to utilize the turn-around are provided by harvesting of the first harvest zone 630-1. As can be seen, the first unloading zone 632-1 and the second unloading zone 632-2 overlap, as indicated by cross-over area 643. System 310, based on the second unload zone 632-2, identifies a second harvest zone 630-2 (as represented by harvest zone schedule indicator 631-2, illustratively shown as H2) to minimize travel of the machines (e.g., mobile grain carts, harvesters) that bring harvested material to the receiving machine 200 positioned at the second unloading zone 632-2.

System 310 has identified a plurality of material transfer locations (represented by 640) within the second harvest zone 630-2 based on one or more items of data 205/305/405 as previously described in FIG. 5, such as, but not limited to, yield data 503.

The third unloading zone 632-3 (as represented by unloading zone schedule indicator 633-3, illustratively shown as U3) is to be used after the completion of the second harvest zone 630-2. System 310 identifies the third unloading zone 632-3 based, at least, on the presence of a worksite obstacle, in the form of a water feature, as represented by 637. The water feature is traversable by mobile grain carts and harvesters but not by mobile grain trailers. Additionally, based on terrain data 505 (e.g., topographic characteristics), system 310 identifies that the ditch 616-2 cannot be traversed by the mobile grain trailer to access and leave from the area of the headland 614-2 to the right (in FIG. 6) of the water feature nor to use the ditch 616-2 as an unloading zone. Additionally, based on terrain data (e.g., soil moisture), system 310 identifies that the crop area 612 around the water feature cannot be traversed by the mobile grain trailer to access and leave from the area of the headland 614-2 to the right (in FIG. 6) of the water feature.

System 310, based on the third unload zone 632-3, identifies a third harvest zone 630-3 (as represented by harvest zone schedule indicator 631-3, illustratively shown as H3) to minimize travel of the machines (e.g., mobile grain carts, harvesters) that bring harvested material to the receiving machine 200 positioned at the second unloading zone 632-2. Further, given the limitation of the water feature (and the terrain characteristics) system 310 generates the third harvest zone 630-3 to cover the remainder of the crop area 612 on the right side (in FIG. 6) as an unloading zone cannot be improved in that direction by further harvesting (i.e., since an unloading zone cannot be put further to the right even with cleared room from harvesting).

As illustrated in FIG. 6, it can be seen that system 310 has identified, based on one or more items of data 205/305/405, a route for a mobile grain trailer to travel to and from the first unloading zone 632-1. A route indicator 642, corresponding to the route, has been generated and displayed on the map at its location in the worksite. As can be seen, system 310 has determined that the mobile grain trailer should travel to the first unloading zone 632-1 by way of field entrance/exit 618 and leave the field 611 by way of field entrance/exit 618. System 310 has determined, based on worksite dimensions data 502 (e.g., dimensions of headland 614-2) and machine data 506 (e.g., turn radius of mobile grain trailer(s)) that the route, represented by 642, should cause the mobile grain trailer to turn around in crop area 612 (after the area is harvested) to arrive and park, with the front of the mobile grain trailer facing the entrance/exit 618, at the first unloading zone 632-1.

As shown in FIG. 6, system 310 has identified, based on one or more items of data 205/305/405 and the one or more unloading zones, a route for a harvester to travel at the first harvest zone 630-1. A route indicator 644, corresponding to the route, has been generated and displayed on the map at its location in the worksite. As can be seen, system 310 has determined that the harvester should travel to the first harvest zone 630-1 and initiate harvesting via an initial harvest pass 645 and execute a turn pattern 646 (illustratively a zig zag turn pattern) to make room for the mobile grain trailer to turn around in the first harvest zone 630-1. In the example of FIG. 6, initial harvest pass 645 is a breakthrough or opening harvesting pass.

It can also be seen that system 310 has identified, based on one or more items of data 205/305/405 or based on the material flow and travel information identified by system 310, or both, timing requirements corresponding to mobile grain trailers and indicating a time at which the mobile grain trailers should be at the unloading zones. As can be seen there is a timing requirement corresponding to each of the three unloading zones. The timing requirements are represented by unloading zone timing indicators 635 (illustratively 635-1, 635-2, and 635-3). As can be seen, system 310 has identified that a mobile grain trailer should be at the first unloading zone 632-1 at 10:00 AM (as indicated by 635-1, illustratively shown as 10), that a mobile grain trailer should be at the second unloading zone 632-2 at 11:00 AM (as indicated by 635-2, illustratively shown as 11), and that a mobile grain trailer should be at the third unloading zone 632-3 at 1:00 PM (as indicated by 635-3, illustratively shown as 1).

It will be understood that the example shown in FIG. 6 is merely one example of a harvesting logistics output 360 and merely one example of the operation of system 310.

Figure 7A:
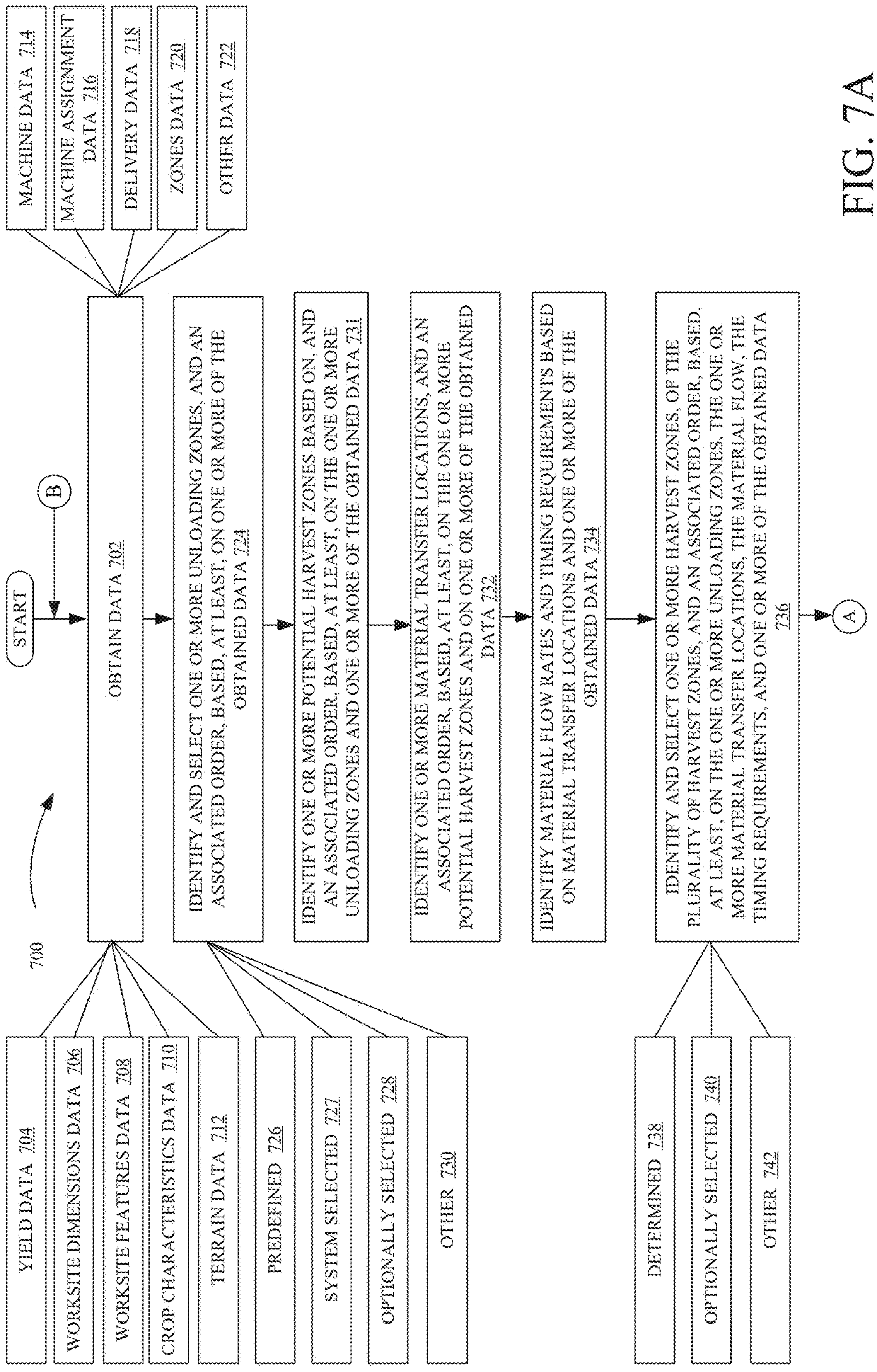
FIGS. 7A-7B (collectively referred to herein as FIG. 7) show a flow diagram illustrating one example operation of an agricultural harvesting operation system architecture in generating harvesting logistics output(s) and control based thereon.
Figure 7B:
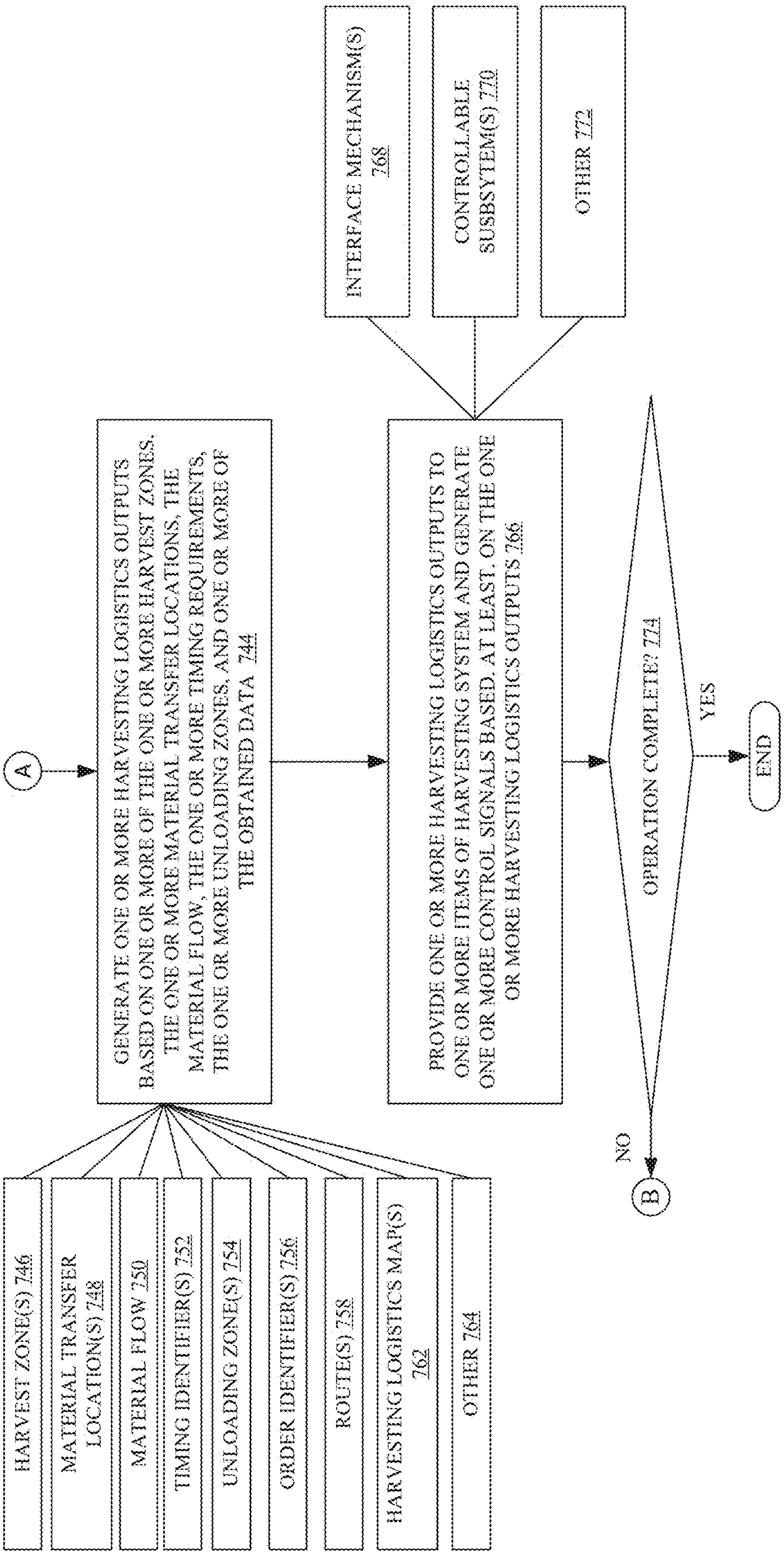

FIGS. 7A-7B (collectively referred to herein as FIG. 7) show a flow diagram illustrating an example operation 700 of harvest system 500 in generating one or more harvesting logistics outputs 360 and control based thereon.

At block 702 one or more items of data are obtained by system 500 (e.g., harvesting logistics system 310). The obtained data can include yield data 501, as indicated by block 704. The obtained data can include worksite dimensions data 502, as indicated by block 706, The obtained data can include worksite features data 503, as indicated by block 708. The obtained data can include crop characteristics data 504, as indicated by block 710. The obtained data can include terrain data 505, as indicated by block 712. The obtained data can include machine data 506, as indicated by block 714. The obtained data can include machine assignment data 507, as indicated by block 716. The obtained data can include delivery data 508, as indicated by block 718. The obtained data can include zones data 509, as indicated by block 720. The obtained data can include various other data 510, as indicated by block 722.

At block 724, harvesting logistics system 310 (e.g., unloading zones identifier system 332) identifies and selects one or more unloading zones, and the order of the one or more unloading zones, for a worksite based, at least, on one or more of the data obtained at block 702. For example, harvesting logistics system 310 can identify and select predefined unloading zones and a corresponding order, as indicated by block 726. The predefined unloading zones and corresponding order can be predefined by an operator or user, such as selection prior to the operation at the worksite, or based on the operation at the worksite already being underway. Harvesting logistics system 310 can, itself, determine and select the unloading zones and the corresponding order, as indicated by block 727. For example, system 310 can, itself, determine and select the unloading zones and the corresponding order based on one or more of the obtained data, such as one or more of worksite dimensions data 502 (e.g., location and dimensions of worksite or sub-areas of the worksite), worksite features data 502, terrain data 505 (e.g., topographic characteristics, etc.), machine data 506 (e.g., machine dimensions and capacities, machine ratings, such as turn radius, etc.), machine assignment data 507, and delivery data 508. As indicated by block 728, system 310 can determine a plurality of potential unloading zones, and an associated order, based on one or more of the obtained data, which can be presented to an operator or user. The operator or user can, by way of input, select or update and select the plurality of potential unloading zones, and associated order, and system 310 can identify the selected unloading zones, and associated order, based on the operator or user input. As indicated by block 730, system 310 can identify and select one or more unloading zones, and a corresponding order, in various other ways, for example, but not by limitation, based on zones data 509 establishing unloading zone criteria and one or more of worksite dimensions data 502 (e.g., location and dimensions of worksite or sub-areas of the worksite), worksite features data 502, terrain data 505 (e.g., topographic characteristics, etc.), machine data 506 (e.g., machine dimensions and capacities, machine ratings, such as turn radius, etc.), machine assignment data 507, and delivery data 508.

At block 731, system 310 (e.g., harvest zones identifier system 340) identifies one or more potential harvest zones, and the order thereof, for a worksite based, at least, on the one or more unloading zones and on one or more of the data obtained at block 702. For example, but not by limitation, system 310 is operable to identify one or more potential harvest zones based on the one or more unloading zones, yield data 501, crop characteristics data 504 (e.g., crop moisture, crop constituents concentrations, crop quality, crop height, downed crop, etc.), machine data 504 (e.g., turn radius of material receiving machine(s), etc.), worksite dimensions data 502, terrain data 505, and worksite features data 503. System 310 can identify one or more potential harvest zones in a variety of other ways.

At block 732, system 310 (e.g., material transfer locations identifier system 334) identifies one or more material transfer locations, and the order thereof, for a worksite based, at least, on the one or more harvest zones and on one or more of the data obtained at block 702. For example, but not by limitation, system 310 is operable to identify one or more material transfer locations based on the one or more potential harvest zones, yield data 501 (e.g., yield of crop in a harvest zone along a route of the harvester), and machine data 506 (e.g., material receptacle/material carrying capacity of a harvester 100). In some examples, the capacity can instead be defined by a set level (e.g., input by an operator or user, or provided in other ways) that defines the level to which the harvester is to be filled to (which can be less than the actual physical capacity of the harvester 100). As previously discussed, system 310, in identifying the one or more material transfer locations, can also take into account the route(s) of the harvester(s), which can be output by system 310 (e.g., route generator 342), or provided in other ways, such as by operator or user input, or detected harvester heading (e.g., by sensors 425).

At block 734, system 310 (e.g. material flow identifier system 336 and timing identifier system 341) identifies material flow and timing requirements corresponding to the operation at the worksite, based, at least, on the one or more material transfer locations and one or more of the data obtained at block 702. For example, but not by limitation, system 310 is operable to identify material flow based on the material transfer locations, machine assignment data 506 (e.g., indicating the type and number of material receiving machines assigned to the operation, etc.), machine data 506 (e.g., indicating the material receptacle/carrying capacity of the material receiving machines, the rated travel speeds of the machines (e.g., material receiving machines) at full and empty, etc.), and delivery data 508 (e.g., indicating the location and distance to delivery locations, etc.). It will be understood that the material flow can indicate or be used to determine the timing of when material will be available for transfer at an unloading zone and thus, can indicate or be used to determine the timing requirements of when a receiving machine (e.g., mobile grain trailer) should be at the unloading zone.

At block 736, system 310 (e.g. harvest zones identifier system 340) identifies and selects one or more harvest zones, and an associated order, based, at least, on one or more unloading zones, the one or more material transfer locations, the material flow, the timing requirements, and one or more of the data obtained at block 702. System 310 identifies a plurality of potential harvest zones and will select one or more of the potential harvest zones as selected (i.e., to be used in the operation) harvest zones. For example, system 310 can identify and select one or more harvest zones of the one or more potential harvest zones given the one or more unloading zones, the one or more material transfer locations, the material flow, the timing requirements, and given other characteristics. For example, characteristics indicated by yield data 501, such as the yield values of the field. In further example, characteristics indicated by crop characteristics data 504, such as crop moisture, crop constituents concentrations, crop quality, crop height, downed crop, as well as various other characteristics based on crop characteristics data 504. In further example, characteristics indicated by machine data 506 such as turn radius requirements of the receiving machine to be positioned at unloading zone, such as the mobile grain trailer, turn radius requirements of machine(s) that will approach the receiving machine positioned at the unloading zone, the location and extension directionality of the chute/spout of the machine(s) that will transfer material to the receiving machine positioned at the unloading zone, dimensions of the machines, as well as other characteristics based on machine data 506. In further example, characteristics based on worksite dimensions data 502 such as location and dimension of headlands, location and dimensions of ditches, locations and dimensions of field entrances/exits, as well as other characteristics based on worksite dimensions data 502. In further example, characteristics based on terrain data 505 such as topographic characteristics (e.g., slope, elevation, etc.) of the worksite, soil moisture, compaction/compaction susceptibility of the worksite, as well as other characteristics based on terrain data 505. In further example, characteristics based on worksite features data 503, such as the location of obstacles and other features at the worksite. It will be understood that harvest zones identifier system 340 can identify a plurality of potential harvest zones or possible harvest zones given various other items of data of data 205/305/405 as well as items or information output by other items of system 310, some examples of which will be described below.

In one example, as indicated by block 738, system 310 can, itself, determine and select one or more harvest zones, and an associated order. In one example, as indicated by block 740, system 310 can identify one or more harvest zones of the one or more potential harvest zones, and an associated order, based, at least, on one or more harvest zones, the one or more material transfer locations, the material flow, the timing requirements, and one or more of the data obtained at block 702. The one or more identified harvest zones of the one or more potential harvest zones, and associated order, can be presented to an operator or user. The operator or user can, by way of input, select or update and select the identified one or more harvest zones, and associated order, and system 310 can identify the selected harvest zones, and associated order, based on the operator or user input. As indicated by block 742, system 310 can identify and select one or more harvest zones, in various other ways.

At block 744, system 310 generates one or more harvesting logistics outputs 360 based on one or more of the one or more harvest zones (and associated order), the one or more material transfer locations (and associated order), the material flow, the one or more timing requirements, the one or more unloading zones (and associated order), and one or more of the data obtained at block 702. As indicated by block 746, the one or more harvesting logistics outputs 360 can include the one or more harvesting zones, which can include providing the one or more harvesting zones in presentable form. As indicated by block 748, the one or more harvesting logistics outputs 360 can include the one or more material transfer locations, which can include providing the one or more material transfer locations in presentable form. As indicated by block 750, the one or more harvesting logistics outputs 360 can include the material flow, which can include providing the material flow in presentable form. As indicated by block 752, the one or more harvesting logistics outputs 360 can include one or more timing identifiers, indicative of the timing requirements, which can include providing the one or more timing identifiers in presentable form. As indicated by block 754, the one or more harvesting logistics outputs 360 can include the one or more unloading zones, which can include providing the one or more unloading zones in presentable form. As indicated by block 756, the one or more harvesting logistics outputs 360 can include one or more order identifiers, indicative of associated order of zones (harvest or unloading, or both) or material transfer locations, or both, which can include providing the one or more order identifiers in presentable form. As indicated by block 758, the one or more harvesting logistics outputs 360 can include one or more routes (e.g., generated by route generator 342), which can include providing the one or more routes in presentable form. As indicated by block 762, the one or more harvesting logistics outputs 360 can include one or more harvesting logistics maps 352 (e.g., generated by map generator system 344). As indicated by block 764, the one or more harvesting logistics outputs 360 can include various other items or information, including, but not limited to other items or information generated by system 310 or other items or information provided in the data obtained at block 702.

At block 766, the one or more harvesting logistics outputs 360 are provided to other items of harvesting operation system architecture 500 (e.g., provided to one or more harvesters 100, one or more receiving machines 200, one or more remote user interface mechanisms 364, etc.) and one or more control signals are generated based, at least, on the one or more provided harvesting logistics outputs 360. For example, as indicated by block 768, one or more control signals can be generated to control one or more interface mechanisms, such as one or more interface mechanisms 218, one or more interface mechanisms 418, or one or more interface mechanisms 364, or a combination of one or more interface mechanisms 218, one or more interface mechanisms 418, and one or more interface mechanisms 364, to generate presentations (e.g., displays, etc.) indicative of or based on the one or more items or information of the provided harvesting logistics outputs 360.

Additionally, or alternatively, as indicated by block 770, one or more control signals can be generated to control one or more controllable subsystems 216 or one or more controllable subsystems 416, or a combination of one or more controllable subsystems 216 and one or more controllable subsystems 416.

Additionally, or alternatively, as indicated by block 772, one or more control signals can be generated to control one or more other items of system 500.

At block 774 it is determined if the harvesting operation is complete. If the harvesting operation is not complete, then processing returns to block 702. If the harvesting operation is complete, then processing ends.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms can include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition can be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores can be local to the systems accessing the data stores, one or more of the data stores can all be located remote form a system utilizing the data store, or one or more data stores can be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality can be distributed among more components. In different examples, some functionality can be added, and some can be removed.

It will be noted that the above discussion has described a variety of different systems, generators, controllers, components, and interactions. It will be appreciated that any or all of such systems, generators, controllers, components, and interactions can be implemented by hardware items, such as one or more processors, one or more processors executing computer executable instructions stored in memory, memory, or other processing components, some of which are described below, that perform the functions associated with those systems, generators, models, controllers, components, or interactions. In addition, any or all of the systems, generators, controllers, components, and interactions can be implemented by software that is loaded into a memory and is subsequently executed by one or more processors or one or more servers or other computing component(s), as described below. Any or all of the systems, generators, controllers, components, and interactions can also be implemented by different combinations of hardware, software, firmware, etc., some examples of which are described below. These are some examples of different structures that can be used to implement any or all of the systems, generators, models, logic, controllers, components, and interactions described above. Other structures can be used as well.

Figure 8:
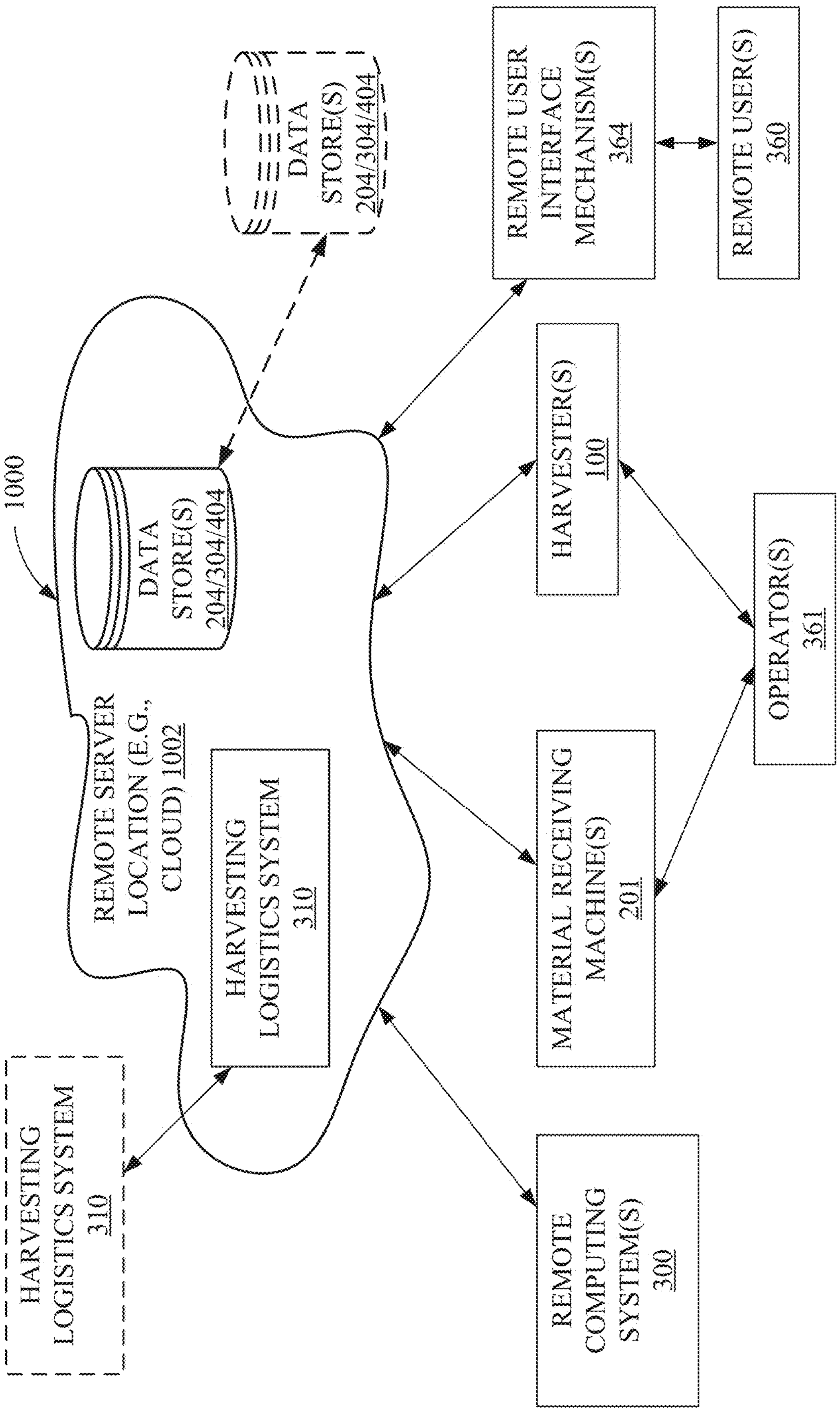
FIG. 8 is a block diagram showing one example of items of an agricultural harvesting operation system architecture in communication with a remote server architecture.

FIG. 8 is a block diagram of a remote server architecture 1000. FIG. 8, also shows one or more agricultural harvesters 100, one or more material receiving machines 200, one or more remote computing systems 300, and one or more remote user interface mechanisms 364 in communication with the remote server environment. The agricultural harvesters 100, material receiving machines 200, remote computing systems 300, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and can be accessible through a web browser or any other computing component. Software or components shown in previous figures as well as data associated therewith, can be stored on servers at a remote location. The computing resources in a remote server environment can be consolidated at a remote data center location, or the computing resources can be dispersed to a plurality of remote data centers. Remote server infrastructures can deliver services through shared data centers, even though the services appear as a single point of access for the user. Thus, the components and functions described herein can be provided from a remote server at a remote location using a remote server architecture. Alternatively, the components and functions can be provided from a server, or the components and functions can be installed on client devices directly, or in other ways.

In the example shown in FIG. 8, some items are similar to those shown in previous figures and those items are similarly numbered. FIG. 8 specifically shows that harvesting logistics system 310, data stores 204, data stores 304, or data stores 404, or a combination thereof, can be located at a server location 1002 that is remote from the agricultural harvesters 100, material receiving machines 200, remote computing systems 300, and remote user interface mechanisms 364. Therefore, in the example shown in FIG. 8, agricultural harvesters 100, material receiving machines 200, remote computing systems 300, and remote user interface mechanisms 364 access systems through remote server location 1002. In other examples, various other items can also be located at server location 1002, such as various other items of harvesting operation system architecture 500.

FIG. 8 also depicts another example of a remote server architecture. FIG. 8 shows that some elements of previous figures can be disposed at a remote server location 1002 while others can be located elsewhere. By way of example, one or more of data store(s) 204, 304, and 404 can be disposed at a location separate from location 1002 and accessed via the remote server at location 1002. Similarly, harvesting logistics system 310 can be disposed at a location separate from location 1002 and accessed via the remote server at location 1002. Regardless of where the elements are located, the elements can be accessed directly by agricultural harvesters 100, material receiving machines 200, remote computing systems 300, and remote user interface mechanisms 364 through a network such as a wide area network or a local area network; the elements can be hosted at a remote site by a service; or the elements can be provided as a service or accessed by a connection service that resides in a remote location. Also, data can be stored in any location, and the stored data can be accessed by, or forwarded to, operators, users, or systems. For instance, physical carriers can be used instead of, or in addition to, electromagnetic wave carriers. In some examples, where wireless telecommunication service coverage is poor or nonexistent, another machine, such as a fuel truck or other mobile machine or vehicle, can have an automated, semi-automated or manual information collection system. As a mobile machine (e.g., agricultural harvester 100 or material receiving machine 200) comes close to the machine containing the information collection system, such as a fuel truck prior to fueling, the information collection system collects the information from the mobile machine (e.g., agricultural harvester 100 or material receiving machine 200) using any type of ad-hoc wireless connection. The collected information can then be forwarded to another network when the machine containing the received information reaches a location where wireless telecommunication service coverage or other wireless coverage is available. For instance, a fuel truck can enter an area having wireless communication coverage when traveling to a location to fuel other machines or when at a main fuel storage location. All of these architectures are contemplated herein. Further, the information can be stored on a mobile machine (e.g., agricultural harvester 100 or material receiving machine 200) until the mobile machine enters an area having wireless communication coverage. The mobile machine (e.g., agricultural harvester 100 or material receiving machine 200), itself, can send the information to another network.

It will also be noted that the elements of previous figures, or portions thereof, can be disposed on a wide variety of different devices. One or more of those devices can include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 can include cybersecurity measures. Without limitation, these measures can include encryption of data on storage devices, encryption of data sent between network nodes, authentication of people or processes accessing data, as well as the use of ledgers for recording metadata, data, data transfers, data accesses, and data transformations. In some examples, the ledgers can be distributed and immutable (e.g., implemented as blockchain).

Figure 9:
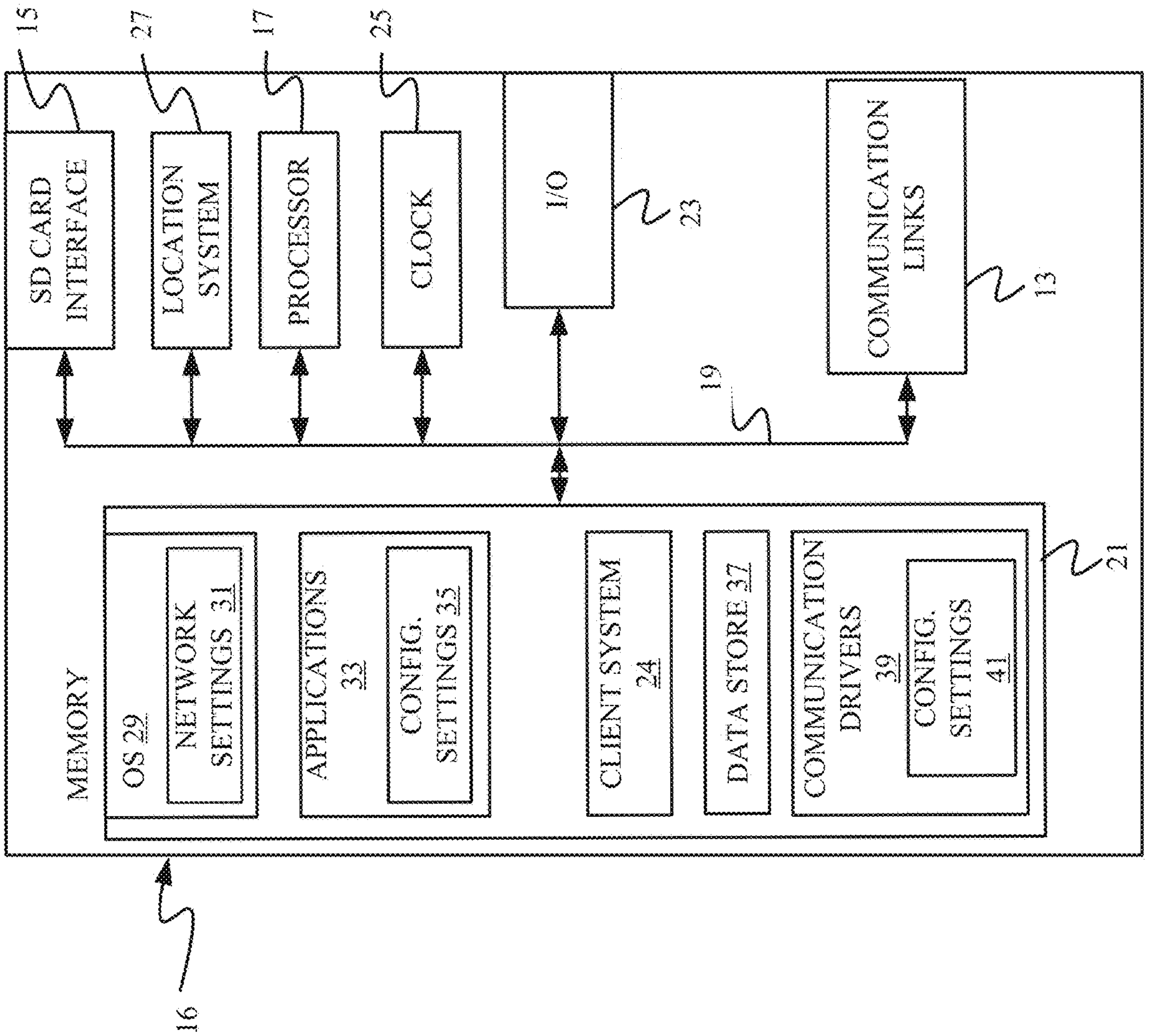
FIGS. 9-11 show examples of mobile devices that can be used in an agricultural harvesting operation system architecture.
Figure 10:
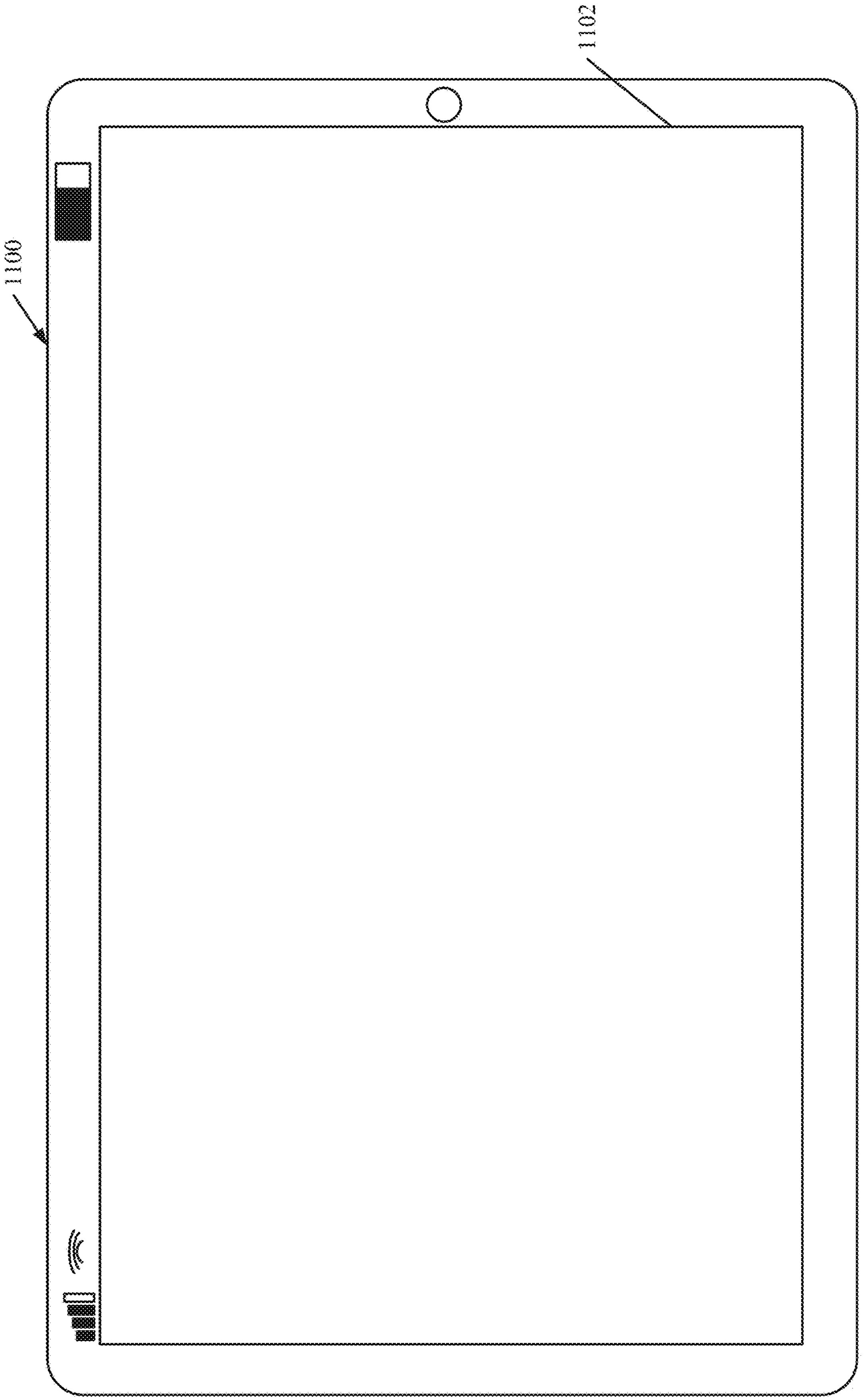
Figure 11:
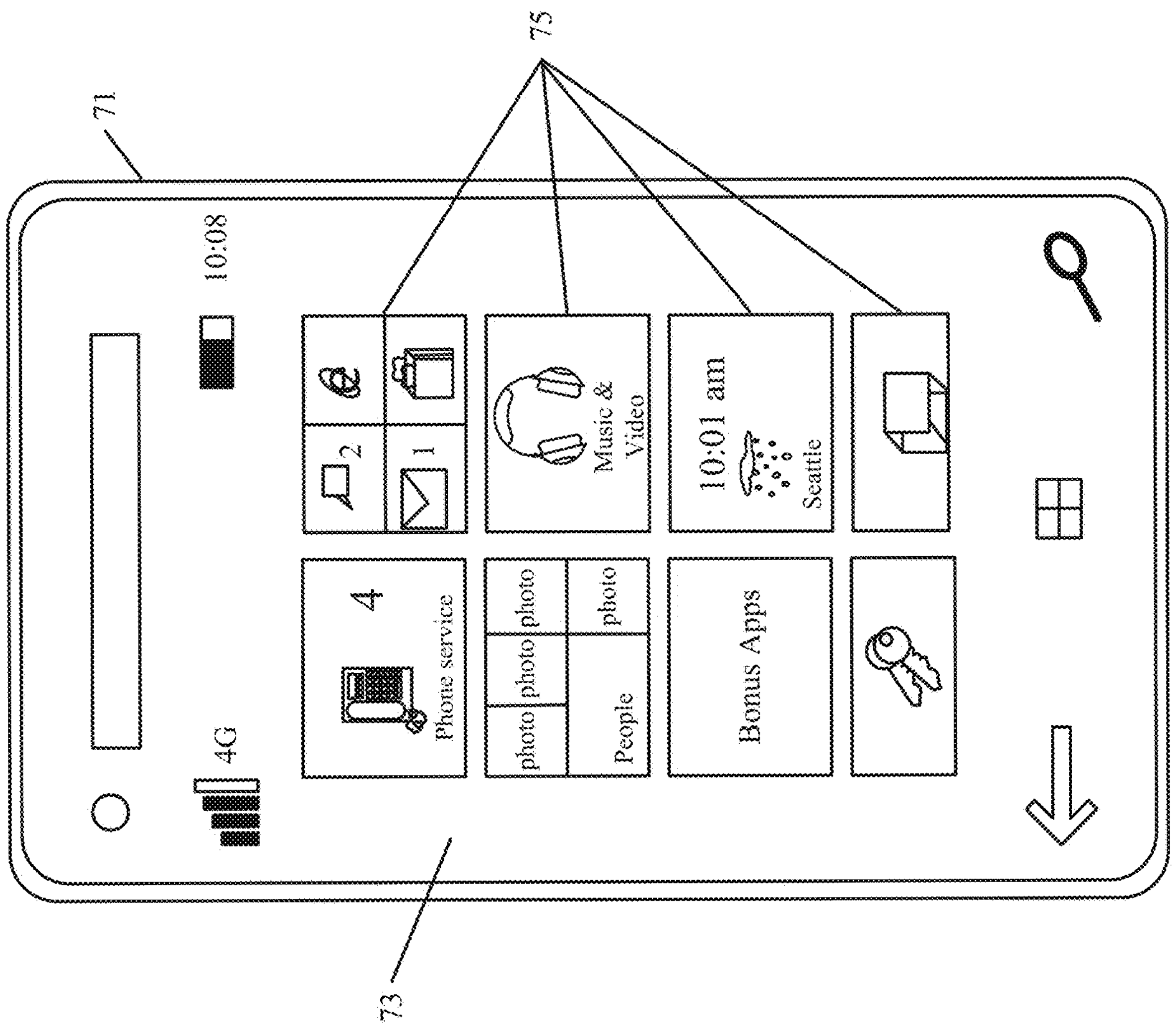

FIG. 9 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., agricultural harvester 100 or material receiving machine 200) for use in generating, processing, or displaying the outputs (e.g., 360) discussed above. FIGS. 10-11 are examples of handheld or mobile devices.

FIG. 9 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 1100. In FIG. 10, computer 1100 is shown with user interface display screen 1102. Screen 1102 can be a touch screen or a pen-enabled interface that receives inputs from a pen or stylus. Tablet computer 1100 can also use an on-screen virtual keyboard. Of course, computer 1100 might also be attached to a keyboard or other user input device through a suitable attachment mechanism, such as a wireless link or USB port, for instance. Computer 1100 can also illustratively receive voice inputs as well.

FIG. 11 is similar to FIG. 10 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
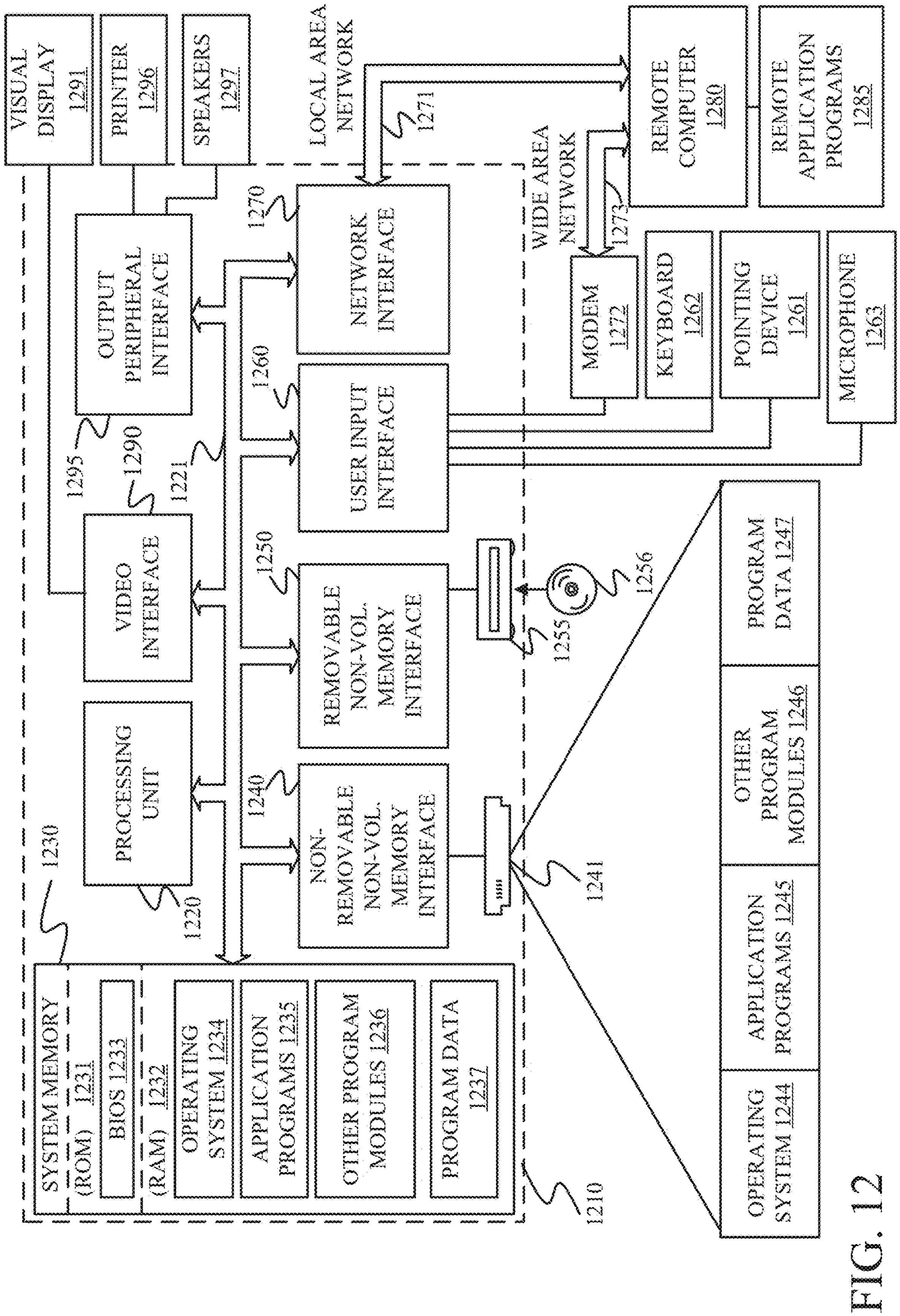
FIG. 12 is a block diagram showing one example of a computing environment that can be used in an agricultural harvesting operation system architecture.

FIG. 12 is one example of a computing environment in which elements of previous figures described herein can be deployed. With reference to FIG. 12, an example system for implementing some embodiments includes a computing device in the form of a computer 1210 programmed to operate as discussed above. Components of computer 1210 can include, but are not limited to, a processing unit 1220 (which can comprise processors or servers from previous figures), a system memory 1230, and a system bus 1221 that couples various system components including the system memory to the processing unit 1220. The system bus 1221 can be any of several types of bus structures including a memory bus or memory controller, a peripheral bus, and a local bus using any of a variety of bus architectures. Memory and programs described with respect to previous figures described herein can be deployed in corresponding portions of FIG. 12.

Computer 1210 typically includes a variety of computer readable media. Computer readable media can be any available media that can be accessed by computer 1210 and includes both volatile and nonvolatile media, removable and non-removable media. By way of example, and not limitation, computer readable media can comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media can embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 12 illustrates operating system 1234, application programs 1235, other program modules 1236, and program data 1237.

The computer 1210 can also include other removable/non-removable volatile/nonvolatile computer storage media. By way of example only, FIG. 12 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), quantum computers, etc.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user can enter commands and information into the computer 1210 through input devices such as a keyboard 1262, a microphone 1263, and a pointing device 1261, such as a mouse, trackball or touch pad. Other input devices (not shown) can include a joystick, game pad, satellite dish, scanner, or the like. These and other input devices are often connected to the processing unit 1220 through a user input interface 1260 that is coupled to the system bus, but can be connected by other interface and bus structures. A visual display 1291 or other type of display device is also connected to the system bus 1221 via an interface, such as a video interface 1290. In addition to the monitor, computers can also include other peripheral output devices such as speakers 1297 and printer 1296, which can be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules can be stored in a remote memory storage device. FIG. 12 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural harvesting system comprising:

one or more processors;

memory storing instructions, executable by the one or more processors, that, when executed by the one or more processors, cause the one or more processors to perform steps comprising:

obtaining harvesting logistics data;

identifying, based, at least, on the harvesting logistics data, one or more unloading zones, each unloading zone indicative of a respective area at a worksite at which a material receiving machine is to be positioned to receive harvested material;

selecting, based, at least, on the one or more unloading zones, one or more harvest zones, each harvest zone indicative of a respective area of the worksite to be harvested; and generating a control signal, to control at least one of: (i) an interface mechanism to generate a presentation based, at least, on the one or more harvest zones; (ii) a controllable subsystem of a harvester based, at least, on the one or more harvest zones; (iii) a controllable subsystem of the material receiving machine based, at least, on the one or more harvest zones; or (iv) a combination of (i), (ii), and (iii).

2. The agricultural harvesting system of claim 1, wherein obtaining harvesting logistics data comprises obtaining harvesting logistics data including, one or more of worksite dimensions data, machine data, machine assignment data, terrain data, and delivery data, and wherein identifying the one or more unloading zones comprises identifying the one or more unloading zones based, at least, on one or more of worksite dimensions data, machine data, machine assignment data, terrain data, and delivery data.

3. The agricultural harvesting system of claim 1, wherein the instructions, when executed by the one or more processors, further configure the one or more processors to perform a step comprising:

identifying, based, at least, on the one or more unloading zones, one or more potential harvest zones; and wherein selecting the one or more harvest zones comprises selecting, as the one or more harvest zones, one or more of the potential harvest zones based, at least, on the one or more unloading zones.

4. The agricultural harvesting system of claim 3, wherein the instructions, when executed by the one or more processors, further configure the one or more processors to perform a step comprising:

identifying, based, at least, on the one or more potential harvest zones, one or more material transfer locations, each material transfer location indicative of a respective area at the worksite at which a respective material receiving machine of a plurality of material receiving machines is to receive harvested material from a respective harvester of a plurality of harvesters; and wherein selecting the one or more harvest zones comprises selecting, as the one or more harvest zones, one or more of the potential harvest zones, based, at least, on the one or more unloading zones and the one or more material transfer locations.

5. The agricultural harvesting system of claim 4, wherein obtaining harvesting logistics data comprises obtaining harvesting logistics data including one or more of yield data, indicative of yield at the worksite, and machine data, indicative of a material tank capacity of each of one or more harvesters, and wherein identifying the one or more material transfer locations comprises determining the one or more material transfer locations based, at least, on the one or more harvest zones and one or more of the yield data and the machine data.

6. The agricultural harvesting system of claim 4, wherein the instructions, when executed by the one or more processors, further configure the one or more processors to perform a step comprising:

identifying, based, at least, on the one or more material transfer locations, a material flow, indicative of a rate at which material will be available for transfer at each unloading zone; and wherein selecting the one or more harvest zones comprises selecting, as the one or more harvest zones, one or more of the potential harvest zones, based at least, on the one or more harvest zones, the one or more material transfer locations, and the material flow.

7. The agricultural harvesting system of claim 1, wherein the instructions, when executed by the one or more processors, further configure the one or more processors to perform a step comprising:

generating a route for a harvester to travel at a harvest zone, wherein generating the route comprises determining an initial harvest pass indicating a first harvest pass of the harvest zone along which the harvester should travel to begin harvesting the harvest zone.

8. A computer implemented method of selecting one or more harvest zones for an agricultural harvesting operation, the computer implemented method comprising:

obtaining harvesting logistics data;

identifying, based, at least, on the harvesting logistics data, one or more unloading zones, each unloading zone indicative of a respective area at a worksite at which a material receiving machine is to be positioned to receive harvested material;

selecting, based, at least, on the one or more unloading zones, one or more harvest zones, each harvest zone indicative of a respective area of the worksite to be harvested; and controlling at least one of: (i) an interface mechanism to generate a presentation based, at least, on the one or more harvest zones; (ii) a controllable subsystem of a harvester based, at least, on the one or more harvest zones; (iii) a controllable subsystem of the material receiving machine based, at least, on the one or more harvest zones; or (iv) a combination of (i), (ii), and (iii).

9. The computer implemented method of claim 8, wherein obtaining harvesting logistics data comprises obtaining harvesting logistics data including one or more of worksite dimensions data, machine data, machine assignment data, terrain data, and delivery data and wherein identifying the one or more unloading zones comprises identifying the one or more unloading zones based, at least, on one or more of the worksite dimensions data, machine data, machine assignment data, terrain data, and delivery data.

10. The computer implemented method of claim 8, and further comprising:

identifying, based, at least, on the one or more unloading zones, one or more potential harvest zones; and wherein selecting the one or more harvest zones comprises selecting, as the one or more harvest zones, one or more of the potential harvest zones based, at least, on the one or more unloading zones.

11. The computer implemented method of claim 10 and further comprising:

identifying, based, at least, on the one or more potential harvest zones, one or more material transfer locations, each material transfer location indicative of a respective area at the worksite at which a material receiving machine is to receive harvested material from a harvester; and wherein selecting the one or more harvest zones comprises selecting, as the one or more harvest zones, one or more of the potential harvest zones, based, at least, on the one or more unloading zones and the one or more material transfer locations.

12. The computer implemented method of claim 11, wherein obtaining harvesting logistics data comprises obtaining harvesting logistics data including one or more of yield data, indicative of yield at the worksite, and machine data, indicative of a material tank capacity of each of one or more harvesters, and wherein identifying the one or more material transfer locations comprises determining the one or more material transfer locations based, at least, on the one or more harvest zones and one or more of the yield data and the machine data.

13. The computer implemented method of claim 11 and further comprising:

identifying, based, at least, on the one or more material transfer locations, a material flow, indicative of a rate at which material will be available for transfer at each unloading zone; and wherein selecting the one or more harvest zones comprises selecting, as the one or more harvest zones, one or more of the potential harvest zones, at least, on the one or more harvest zones, the one or more material transfer locations, and the material flow.

14. The computer implemented method of claim 8 and further comprising:

generating a route for a harvester to travel at a harvest zone, wherein generating the route comprises determining an initial harvest pass indicating a first harvest pass of the harvest zone along which the harvester should travel to begin harvesting the harvest zone.

15. An agricultural harvesting system comprising:

one or more processors;

memory storing instructions, executable by the one or more processors, that, when executed by the one or more processors, cause the one or more processors to perform steps comprising:

obtaining harvesting logistics data;

identifying, based, at least, on the harvesting logistics data, an unloading zone, the unloading zone indicative of an area at a worksite at which a mobile grain trailer is to be positioned to receive harvested material;

identifying, based, at least, on the unload zone, a plurality of potential harvest zones, each potential harvest zone indicative of a sub-area of a field, of the worksite, to be harvested;

identifying, based, at least, on the plurality of potential harvest zones, a respective one or more material transfer locations corresponding to each potential harvest zone, each material transfer location indicative of a respective area at the worksite at which a mobile grain cart is to receive harvested material from a harvester; and identifying, based, at least, on the respective one or more material transfer locations, a respective material flow for each potential harvest zone, each respective material flow indicative of a rate at which the harvested material will be available to transfer to the mobile grain trailer;

selecting, based, at least, on the unloading zone, the material transfer locations, and the material flows, a harvest zone of the plurality of potential harvest zones; and controlling at least one of: (i) an interface mechanism to generate a presentation based, at least, on the selected harvest zone; (ii) a controllable subsystem of the harvester based, at least, on the selected harvest zone; (iii) a controllable subsystem of a material receiving machine based, at least, on the selected harvest zone; or (iv) a combination of (i), (ii), and (iii).

* * * * *